(12) United States Patent
Uemura et al.

(10) Patent No.: US 9,832,762 B2
(45) Date of Patent: Nov. 28, 2017

(54) TERMINAL APPARATUS, BASE STATION APPARATUS, COMMUNICATION SYSTEM, NOTIFICATION METHOD, AND INTEGRATED CIRCUIT

(71) Applicant: SHARP KABUSHIKI KAISHA, Osaka-shi, Osaka (JP)

(72) Inventors: Katsunari Uemura, Osaka (JP); Yasuyuki Kato, Osaka (JP); Hidekazu Tsuboi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/107,339

(22) PCT Filed: Dec. 22, 2014

(86) PCT No.: PCT/JP2014/083908
§ 371 (c)(1),
(2) Date: Jun. 22, 2016

(87) PCT Pub. No.: WO2015/098837
PCT Pub. Date: Jul. 2, 2015

(65) Prior Publication Data
US 2017/0006598 A1  Jan. 5, 2017

(30) Foreign Application Priority Data
Dec. 26, 2013 (JP) .................................. 2013-269084

(51) Int. Cl.
*H04W 72/00* (2009.01)
*H04W 72/04* (2009.01)
(Continued)

(52) U.S. Cl.
CPC ......... *H04W 72/0413* (2013.01); *H04L 5/001* (2013.01); *H04L 5/0048* (2013.01);
(Continued)

(58) Field of Classification Search
CPC ........... H04W 72/0413; H04W 72/042; H04W 24/04; H04W 52/346; H04W 52/146;
(Continued)

(56) References Cited

PUBLICATIONS

3GPP TR 36.842 V1.0.0 (Nov. 2013) 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12).*

(Continued)

*Primary Examiner* — Ronald Eisner
(74) *Attorney, Agent, or Firm* — Birch, Stewart, Kolasch & Birch, LLP

(57) ABSTRACT

There is provided a technology associated with a terminal apparatus, a base station apparatus, a communication system, a notification method, and an integrated circuit, in all of which the capability of the terminal apparatus is efficiently notified. The terminal apparatus configures multiple pieces of terminal apparatus capability information that include information indicating whether or not to support transmission of multiple physical uplink control channels in a secondary cell, and information indicating whether or not to support data transfer control that is independent of a primary cell and the secondary cell, and transmits a terminal apparatus capability message including the multiple pieces of terminal apparatus capability information, to the base station apparatus.

8 Claims, 7 Drawing Sheets

(51) Int. Cl.
- *H04M 3/00* (2006.01)
- *H04W 8/24* (2009.01)
- *H04W 16/32* (2009.01)
- *H04L 5/00* (2006.01)

(52) U.S. Cl.
CPC ............... *H04M 3/00* (2013.01); *H04W 8/24* (2013.01); *H04W 16/32* (2013.01); *H04W 72/0453* (2013.01); *H04L 5/005* (2013.01); *H04L 5/0051* (2013.01)

(58) Field of Classification Search
CPC . H04W 72/1284; H04W 88/02; H04W 88/08; H04W 88/06; H04W 28/0278; H04W 52/281; H04W 16/32; H04W 48/20
USPC ............ 455/422.1, 450–455, 464, 509; 370/328–337, 339, 341–348, 431–463
See application file for complete search history.

(56) References Cited

PUBLICATIONS

3GPP TR 36.842 V1.0.0, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", (Nov. 2013).

3GPP TR 36.912 V9.3.0, 3rd Generation Partnership Project; Technical Specification Group Radio Access Network; Feasibility study for Further Advancements for E-UTRA (LTE-Advanced) (Release 9), (Jun. 2010).

NTT Docomo, Inc., "7.2 Deployment scenarios and design goals for dual connectivity", 3GPP TSG-RAN WG2 #81, R2-130444, pp. 1-6, Jan. 28-Feb. 2013, St. Julian's, Malta.

Inter Digital Communications: "Dual Connectivity for Small Cell Deployments" 3GPP Draft; R2-131996, vol. RAN WG2, no. Fukuoka, Japan, May 10, 2013, XP050699962, URL:http://www.3gpp.org/ftp/tsg_ran/WG2_RL2/TSGR2_82/Docs/ [retrieved on May 10, 2013].

* cited by examiner

|  | BandCommbinationParameters | multipleTimingAdvance | pucchOnScell | multipleMAC-config |
|---|---|---|---|---|
| (CASE 1)<br>Carrier Aggregation | ✓ | — | — | — |
| (CASE 2)<br>Multi-TA | ✓ | ✓ | — | — |
| (CASE 3)<br>Carrier Aggregation<br>+ SCell PUCCH | ✓ | — | ✓ | — |
| (CASE 4)<br>Multi-TA + SCell PUCCH | ✓ | ✓ | ✓ | — |
| (CASE 5)<br>Dual connectivity | ✓ | ✓ | ✓ | ✓ |

FIG. 5
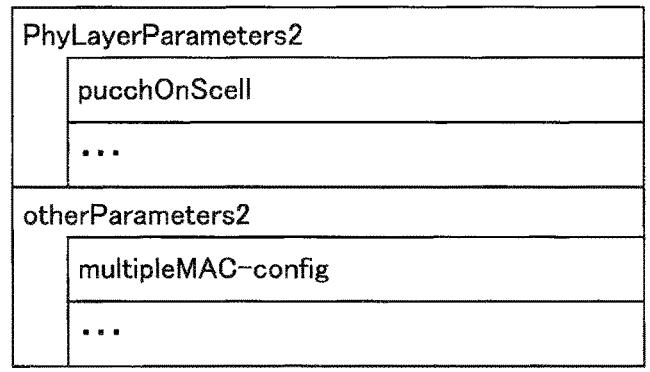
FIG. 6
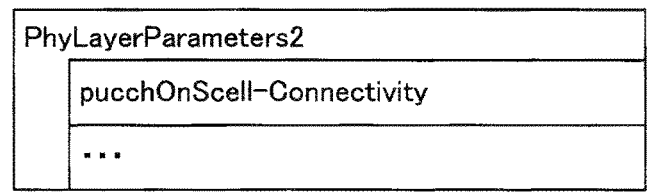
FIG. 7
| | BandCommbinationParameters | multipleTimingAdvance | pucchOnScell-Connectivity |
|---|---|---|---|
| (CASE 1)<br>Carrier Aggregation | ✓ | — | — |
| (CASE 2)<br>Multi-TA | ✓ | ✓ | — |
| (CASE 3)<br>Carrier Aggregation<br>+ SCell PUCCH | ✓ | — | Single |
| (CASE 4)<br>Multi-TA + SCell PUCCH | ✓ | ✓ | Single |
| (CASE 5)<br>Dual connectivity | ✓ | ✓ | Dual |

| RF BandCombination#1 | Band#1, Band#1 |
| RF BandCombination#2 | Band#1, Band#5 |
| RF BandCombination#3 | Band#1 |
| RF BandCombination#4 | Band#5 |

TERMINAL APPARATUS, BASE STATION APPARATUS, COMMUNICATION SYSTEM, NOTIFICATION METHOD, AND INTEGRATED CIRCUIT

This application claims the benefit of Japanese Priority Patent Application JP 2013-269084 filed Dec. 26, 2013, the entire contents of which are incorporated herein by reference.

TECHNICAL FIELD

Embodiments of the present invention relate to a technology associated with a terminal apparatus, a base station apparatus, a communication system, a notification method, and an integrated circuit, in all of which the capability of the terminal apparatus is efficiently notified.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency or time units, which is referred to as an orthogonal frequency-division multiplexing (OFDM) communication scheme or a resource block.

Furthermore, in 3GPP, discussions on Advanced EUTRA that realizes higher-speed data transfer and has forward compatibility with EUTRA have taken place. In EUTRA, a network is mainly assumed in which the base station apparatuses have almost the same cell constitution (cell size). However, in Advanced EUTRA, a network (heterogeneous wireless network or heterogeneous network) is assumed in which the base station apparatuses (the cells) having different constitutions are present in a mixed manner in the same area and a control method that is adapted for this network has been under study.

A technology (dual connectivity), in which, as in the heterogeneous network, in a communication system in which a cell (a macro cell) with a large radius and a cell (a small cell) with a radius smaller than that of the macro cell are arranged in a mixed manner, the terminal apparatus makes connections to multiple cells of the base station apparatus at the same time and performs communication, has been under study (NPL 1).

In order to realize the dual connectivity, the base station apparatus needs to know the capability (UE capability) of the terminal apparatus in advance in terms of whether or not the terminal apparatus is one that supports the dual connectivity. However, for the dual connectivity, in addition to carrier aggregation that is disclosed in NPL 2, a variety of new technologies are expected to be introduced. For example, in NPL 3, multiple architectures in the dual connectivity are disclosed.

CITATION LIST

Non Patent Literature

NPL 1: R2-130444 and NTT DOCOMO, INC. and 3GPP TSG-RAN2#81, St. Julian's, Malta, Jan. 28-Feb. 1, 2013. http://www.3gpp.org/ftp/tsg_ran/WG2_RL2/TSGR2_81/Docs/

NPL 2: 3GPP TS 36.912 V9.3.0 (2010-06) http://www.3gpp.org/ftp/Specs/archive/36_series/36.912/

NPL 3: 3GPP TS 36.842 V1.0.0 (2013-11) http://www.3gpp.org/ftp/Specs/archive/36_series/36.842/

SUMMARY OF INVENTION

Technical Problem

As in carrier aggregation in the related art, when a terminal apparatus notifies a base station apparatus of only one piece of information indicating whether or not dual connectivity is possible for a combination of frequency bands that are able to be aggregated by the terminal apparatus, as information indicating a capability of the terminal apparatus, it is difficult for the base station apparatus to specify which function the terminal apparatus is able to realize in the dual connectivity.

Particularly, in the case of a communication technology, such as one that is realized by multiple functions as in the dual connectivity, by employing a constitution in which the capability of the terminal apparatus is categorized by a specific function, and the capability of the terminal apparatus is notified for every function, control that uses only an indispensable function is possible and stepwise mounting can be performed. This is an efficient method. However, this constitution has not yet been under study.

An object of embodiments of the present invention, which were contrived in view of the problems described above, is to deal with at least one of the problems described above by providing a technology associated with a terminal apparatus, a base station apparatus, a communication system, a notification method, and an integrated circuit, in all of which it is possible to efficiently notify the capability of the terminal apparatus.

Solution to Problem (1) According to an embodiment of the present invention, there is provided a terminal apparatus that is able to communicate with multiple base station apparatuses using multiple serving cells that include a primary cell and a secondary cell, in which first information indicating whether or not to support transmission and reception to and from the multiple base station apparatuses and second information indicating whether or not to support partial transfer of radio bearers involved in the multiple base station apparatuses are configured as terminal apparatus capability information, and a terminal apparatus capability message including the terminal apparatus capability information is transmitted to the base station apparatus, in which the transmission and reception to and from the multiple base station apparatuses are performed by multiple MAC layers that correspond to the multiple base station apparatuses, respectively, and in which the multiple MAC layers support transmission of a physical uplink control channel in a cell within a cell group that belongs to the multiple base station apparatuses.

(2) In the terminal apparatus according to the embodiment described above, the first information may be configured in such a manner as to correspond to each combination of frequency bands that are supported by the terminal apparatus.

(3) In the terminal apparatus according to the embodiment described above, the terminal apparatus capability information may be information indicating whether or not communication that uses dual connectivity is possible in the combination of the frequency bands.

(4) According to another embodiment of the present invention, there is provided a base station apparatus that is able to communicate with a terminal apparatus using multiple serving cells that include a primary cell and a secondary cell, in which a terminal apparatus capability message including first information indicating whether or not to support transmission and reception to and from the multiple base station apparatuses and second information indicating whether or not to support partial transfer of radio bearers involved in the multiple base station apparatuses is received, as terminal apparatus capability information, from the terminal apparatus, in which radio resource configuration information is transmitted to the terminal apparatus, based on the terminal apparatus capability information, and in which the first information indicates that, in the terminal apparatus, transmission of multiple MAC layers that correspond to the multiple base station apparatuses, respectively, and of physical uplink control channels in the multiple MAC layers are possible.

(5) The base station apparatus according to the embodiment described above may be constituted in such a manner that the radio resource configuration information is transmitted to the terminal apparatus, based on the first information that is configured in such a manner as to correspond to each combination of the frequency bands.

(6) The base station apparatus according to the embodiment described above may be constituted in such a manner that it is determined whether or not radio resource configuration information relating to the dual connectivity is able to be configured for the terminal apparatus, based on the first information that is configured in such a manner as to correspond to each combination of the frequency bands.

(7) According to still another embodiment of the present invention, there is provided a communication system that is constituted from a terminal apparatus that performs communication using multiple serving cells which include a primary cell and a secondary cell, and a base station apparatus that communicates with the terminal apparatus, in which the terminal apparatus configures first information indicating whether or not to support transmission and reception to and from the multiple base station apparatuses and second information indicating whether or not to support partial transfer of radio bearers involved in the multiple base station apparatuses, as terminal apparatus capability information, and transmits a terminal apparatus capability message including the terminal apparatus capability information to the base station apparatus, in which the transmission and reception to and from the multiple base station apparatuses are performed by multiple MAC layers that correspond to the multiple base station apparatuses, respectively, in which the multiple MAC layers support transmission of a physical uplink control channel in a cell within a cell group that belongs to the multiple base station apparatuses, and in which the base station apparatus receives the terminal apparatus capability message including the terminal apparatus capability information, and transmits radio resource configuration information to the terminal apparatus based on the terminal apparatus capability information.

(8) According to still another embodiment of the present invention, there is provided a notification method for use in a terminal apparatus that is able to communicate with multiple base station apparatuses using multiple serving cells that include a primary cell and a secondary cell, the communication method including: a step of configuring first information indicating whether or not to support transmission and reception to and from the multiple base station apparatuses and second information indicating whether or not to support partial transfer of radio bearers involved in the multiple base station apparatuses, as terminal apparatus capability information; and a step of transmitting a terminal apparatus capability message including the terminal apparatus capability information to the base station apparatus, in which the transmission and reception to and from the multiple base station apparatuses are performed by multiple MAC layers that correspond to the multiple base station apparatuses, respectively, and in which the multiple MAC layers support transmission of a physical uplink control channel in a cell within a cell group that belongs to the multiple base station apparatuses.

(9) The communication method according to the embodiment described above may further include a step of configuring the first information in such a manner as to correspond to each combination of frequency bands that are supported by the terminal apparatus.

(10) according to still another embodiment of the present invention, there is provided a communication method for use in a base station apparatus that is able to communicate with a terminal apparatus using multiple serving cells that include a primary cell and a secondary cell, the communication method including: a step of receiving a terminal apparatus capability message including first information indicating whether or not to support transmission and reception to and from the multiple base station apparatuses and second information indicating whether or not to support partial transfer of radio bearers involved in the multiple base station apparatuses, as terminal apparatus capability information, from the terminal apparatus; and a step of transmitting radio resource configuration information to the terminal apparatus, based on the terminal apparatus capability information, in which the first information indicates that, in the terminal apparatus, transmission of multiple MAC layers that correspond to the multiple base station apparatuses, respectively, and of physical uplink control channels in the multiple MAC layers are possible.

(11) According to still another embodiment of the present invention, there is provided an integrated circuit that is built into a terminal apparatus that is able to communicate with multiple base station apparatuses using multiple serving cells that include a primary cell and a secondary cell, the integrated circuit causing the terminal apparatus at least to perform: a function of configuring first information indicating whether or not to support transmission and reception to and from the multiple base station apparatuses and second information indicating whether or not to support partial transfer of radio bearers involved in the multiple base station apparatuses, as terminal apparatus capability information; and a function of transmitting a terminal apparatus capability message including the terminal apparatus capability information to the base station apparatus, in which the transmission and reception to and from the multiple base station apparatuses are performed by multiple MAC layers that correspond to the multiple base station apparatuses, respectively, and in which the multiple MAC layers support transmission of a physical uplink control channel in a cell within a cell group that belongs to the multiple base station apparatuses.

(12) The integrated circuit according to the embodiment described above may be constituted in such a manner as to cause the terminal apparatus to further perform a function of configuring the first information in such a manner as to correspond to each combination of frequency bands that are supported by the terminal apparatus.

(13) According to still another embodiment of the present invention, there is provided an integrated circuit that is built into a base station apparatus that is able to communicate with a terminal apparatus using multiple serving cells that include a primary cell and a secondary cell, the integrated circuit causing the base station apparatus at least to perform: a function of receiving a terminal apparatus capability message including first information indicating whether or not to support transmission and reception to and from the multiple base station apparatuses and second information indicating whether or not to support partial transfer of radio bearers involved in the multiple base station apparatuses, as terminal apparatus capability information, from the terminal apparatus; and a function of transmitting radio resource configuration information to the terminal apparatus, based on the terminal apparatus capability information, in which the first information indicates that, in the terminal apparatus, transmission of multiple MAC layers that correspond to the multiple base station apparatuses, respectively, and of physical uplink control channels in the multiple MAC layers are possible.

Advantageous Effects of Invention

According to embodiments of the present invention, a technology associated with a terminal apparatus, a base station apparatus, a communication system, a notification method, and an integrated circuit, in all of which efficient notification of a capability of the terminal apparatus is possible, can be provided.

BRIEF DESCRIPTION OF DRAWINGS

FIG. 5 is a diagram illustrating an architecture of a terminal apparatus capability message according to a second embodiment of the present invention.

FIG. 6 is a diagram illustrating an architecture of a terminal apparatus capability message according to a third embodiment of the present invention.

FIG. 7 is a diagram illustrating a relationship between multiple pieces of terminal apparatus capability information and a function that is included in the terminal apparatus, according to the third embodiment of the present invention.

DESCRIPTION OF EMBODIMENTS

Figure 1:
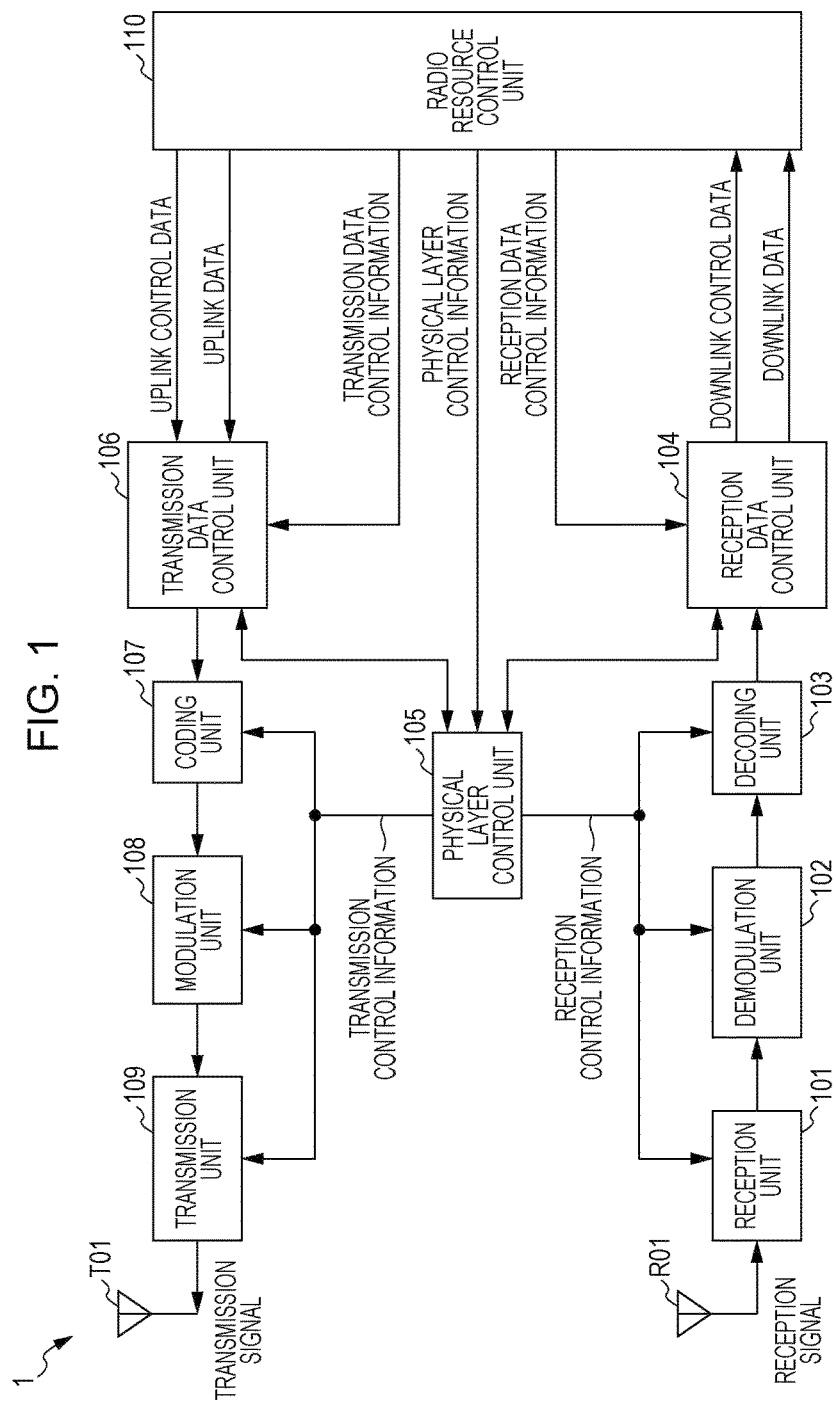
FIG. 1 is a block diagram illustrating one example of a schematic constitution of a terminal apparatus according to an embodiment of the present invention.

A technology relating to each embodiment of the present invention will be described briefly below.

[Physical Channel/Physical Signal]

Physical channels and physical signals that are mainly used in EUTRA and Advanced EUTRA are described. A channel means a medium that is used for signal transmission and reception, and a physical channel means a physical medium that is used for signal transmission and reception. According to the present invention, the physical channel and the signal can be used synonymously. There is a likelihood that in EUTRA and Advanced EUTRA, the physical channel will be added in future or an architecture or format type thereof will be changed or added, but this change or addition does not have any influence on a description of each embodiment of the present invention.

In EUTRA and Advanced EUTRA, scheduling of the physical channel or the physical signal is managed using a radio frame. One radio frame is 10 ms, and one radio frame is constituted from 10 subframes. Additionally, one subframe is constituted from two slots (that is, one subframe is 1 ms and one slot is 0.5 ms). Furthermore, management is performed using a resource block as a minimum unit of scheduling for allocating the physical channel. The resource block is defined by a fixed frequency domain that is constituted from a set of multiple subcarriers (for example, 12 subcarriers) along a frequency axis and by a domain that is constituted from a fixed transmission time interval (1 slot).

A synchronization signal is constituted from 3 types of primary synchronization signals and a secondary synchronization signal that is constituted from 31 types of codes which are alternately arranged in the frequency domain. With a combination of these signals, the primary synchronization signal and the secondary synchronization signal, 504 cell identifiers (physical cell identity (PCI)) for identifying a base station apparatus and a frame timing for wireless synchronization are indicated. A terminal apparatus specifies a physical cell ID of the synchronization signal that is received through cell search.

A physical broadcast channel (PBCH) is transmitted for the purpose of notifying (configuring) a control parameter (broadcast information (system information)) that is used in a shared manner in terminal apparatuses within a cell. For the broadcast information that is not notified on the physical broadcast information channel, a radio resource in which the broadcast information is transmitted on a physical downlink control channel is notified to the terminal apparatus within the cell, and in the notified radio resource, a layer 3 message (system information) for notifying the broadcast information using a physical downlink shared channel is transmitted.

As pieces of broadcast information, a cell global identifier (CGI) indicating a cell-dedicated identifier, a tracking area identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, the cell-specific reference signal (RS) is a pilot signal that is transmitted with a prescribed power for every cell, and is a downlink reference signal that is periodically iterated in the frequency domain and the time domain based on a prescribed rule. The terminal apparatus measures received quality for every cell by receiving the cell-specific RS. Furthermore, the terminal apparatus also uses a downlink cell-specific RS as a reference signal for demodulation of the physical downlink control channel that is transmitted at the same time that the cell-specific RS is transmitted, or of the physical downlink shared channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as a channel state information reference signal (CSI-RS). Furthermore, the downlink reference signal that is dedicated to the terminal apparatus is referred to as UE-specific reference signal (URS) or demodulation RS (DMRS), and is referred to for channel compensation processing of the channel that is to be performed when demodulating the physical downlink control channel or the physical downlink shared channel.

A physical downlink control channel (PDCCH) is transmitted in several OFDM symbols (for example, 1 to 4 OFDM symbols) starting from the head of each subframe. An enhanced physical downlink control channel (EPDCCH) is a physical downlink control channel that is allocated to the OFDM symbols to which the physical downlink shared channel (PDSCH) is allocated. The PDCCH or the EPDCCH is used for the purpose of notifying radio resource allocation information in accordance with the scheduling by the base station apparatus for the terminal apparatus, or information indicating an amount of adjustment for an increase or decrease in transmit power. Unless otherwise specified, the physical downlink control channel (PDCCH) that will be described below means both of the physical channels, the PDCCH and the EPDCCH.

The terminal apparatus monitors a physical downlink control channel that is destined for the terminal apparatus itself before transmitting and receiving the layer 3 message (paging, a handover command, or the like) that is downlink data or downlink control data, and receives the physical downlink control channel that is destined for the terminal apparatus itself. Thus, the terminal apparatus needs to acquire from the physical downlink control channel the radio resource allocation information that is referred to as an uplink grant at the time of the transmission and as a downlink grant (a downlink assignment) at the time of the reception. Moreover, in addition to being transmitted in the OFDM symbol described above, the physical downlink control channel is also able to be constituted to be transmitted in a region of the resource block that is dedicatedly allocated from the base station apparatus to the terminal apparatus.

A physical uplink control channel (PUCCH) is used for an acknowledgement response (Acknowledgement/Negative Acknowledgement (ACK/NACK)) for reception of data that is transmitted on the physical downlink shared channel, for downlink channel (channel state) information (Channel State Information (CSI)), or for making an uplink radio resource allocation request (a radio resource request, a scheduling request (SR)).

Pieces of CSI include a channel quality indicator (CQI), a precoding matrix indicator (PMI), a precoding type indicator (PTI), and a rank indicator (RI). Each indicator may be expressed as indication.

The physical downlink shared channel (PDSCH) is also used for notifying the terminal apparatus of the broadcast information (system information) that is not notified, as the layer 3 message, by paging or on the physical broadcast channel, as well as the downlink data. The radio resource allocation information of the physical downlink shared channel is indicated with the physical downlink control channel. The physical downlink shared channel is transmitted in a state of being arranged in OFDM symbols other than the OFDM symbols in which the physical downlink control channel is transmitted. That is, the physical downlink shared channel and the physical downlink control channel are time-multiplexed within one subframe.

Uplink data and uplink control data is able to be mainly transmitted on a physical uplink shared channel (PUSCH), and the PUSCH is able to include control data, such as the received quality in the downlink or an ACK/NACK. Furthermore, the physical uplink shared channel (PUSCH) is also used for the terminal apparatus to notify the base station apparatus of uplink control information as the layer 3 message, as well as the uplink data. Furthermore, as is the case in the downlink, the radio resource allocation information of the physical uplink shared channel is indicated with the physical downlink control channel.

Included in an uplink reference signal (which is also referred to as an uplink reference signal, an uplink pilot signal or an uplink pilot channel) are a demodulation reference signal (DMRS) that is used for the base station apparatus to demodulate the physical uplink control channel (PUCCH) and/or the physical uplink shared channel (PUSCH) and a sounding reference signal (SRS) that is used for the base station apparatus to mainly estimate an uplink channel state.

Furthermore, as the sounding reference signal, there are a periodic sounding reference signal (Periodic SRS) and an aperiodic sounding reference signal (Aperiodic SRS) that is transmitted when the base station apparatus gives an instruction to do so.

A physical random access channel (PRACH) is a channel that is used for notifying (configuring) a preamble sequence and has a guard time. The preamble sequence is constituted in such a manner that information is notified to the base station apparatus with multiple sequences. For example, in a case where 64 types of sequences are prepared, 6-bit information can be indicated to the base station apparatus. The physical random access channel is used as a means by which the terminal apparatus has access to the base station apparatus.

The terminal apparatus uses the physical random access channel in order to make the uplink radio resource request when the physical uplink control channel is not configured, to make a request to the base station apparatus for the transmission timing adjustment information (which is also referred to as timing advance (TA)) indispensable for adjusting an uplink transmission timing to a reception timing window of the base station apparatus, or to perform an operation like this. Furthermore, the base station apparatus can also make a request to the terminal apparatus for starting of a random access procedure using the physical downlink control channel.

The layer 3 message is a message that is handled with a protocol of a control-plane (C-Plane) (CP) that is exchanged in radio resource control (RRC) layers of the terminal apparatus and the base station apparatus. The layer 3 message and RRC signaling or an RRC message can be used synonymously. Moreover, in contrast with the control-plane, a plane of which a protocol is for handling user data is referred to as a user-plane (U-Plane) (UP).

Moreover, detailed descriptions of physical channels or physical signals other than these are omitted because they have no relationship with each embodiment of the present invention. As physical channels or physical signals of which the descriptions are omitted, there are a physical control format indicator channel (PCFICH), a physical hybrid ARQ indicator channel (PHICH), a physical multicast channel (PMCH) and the like.

[Wireless Network]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. When cells that are covered by different types of base station apparatuses or that have different radii are present in a mixed manner in an area where the same frequency or different frequencies are available and one communication system is formed, this wireless network is referred to as a heterogeneous network.

The terminal apparatus regards the inside of the cell as the communication area, and operates. When the terminal apparatus moves from a certain cell to a different cell, the terminal apparatus moves to a separate suitable cell by a cell re-selection procedure at the time of a non-wireless connection (an idle state) and by a handover procedure at the time of a wireless connection (in a connected state). The suitable cell is a cell in which it is determined that generally, the access by terminal apparatus is not allowed based on information that is designated from the base station apparatus, and in which the received quality in the downlink satisfies a prescribed condition.

The base station apparatus manages a certain cell that is an area where the terminal apparatus is able to communicate with the base station apparatus, from one frequency to another. One base station apparatus may manage multiple cells. Cells are categorized into multiple types according to the size of an area (the cell size) where communication with the terminal apparatus is possible. For example, cells are categorized into macro cells and small cells. Generally, the small cell is a cell that has a coverage area with a radius of several meters to several-ten meters. Furthermore, the small cells are categorized femto cells, pico cells, nano cells, and the like according to their coverage areas.

When the terminal apparatus is able to communicate with a certain base station, among cells that are covered by the certain base station apparatus, a cell that is configured in such a manner that the cell is used for communication with the terminal apparatus is referred to as a serving cell, the other cells that are not used for the communication are referred to as neighboring cells.

[Carrier Aggregation]

A technology (carrier aggregation) in which frequencies (component carriers or frequency bands) in multiple different frequency bands are aggregated and are handled as if they were one frequency (frequency band) may be applied to the terminal apparatus and the base station apparatus. In the carrier aggregation, as component carriers, there are an uplink component carrier that corresponds to the uplink and a downlink component carrier that corresponds to the downlink. In the present specification, the frequency and the frequency band are used synonymously.

For example, in a case where with the carrier aggregation, component carriers in a frequency bandwidth of 20 MHz are aggregated into 5 component carriers, the terminal apparatus that has the capability to enable the carrier aggregation performs transmission and reception with the 5 component carriers being regarded as a frequency bandwidth of 100 MHz. Moreover, although the component carriers are aggregated are contiguous frequencies, all or some of the component carriers may be non-contiguous frequencies. For example, available frequency bands are an 800 MHz band, a 2 GHz band, and a 3.5 GHz band, one component carrier may be transmitted in the 800 MHz band, one component in the 2 GHz band, and finally the third component in the 3.5 GHz band.

Furthermore, it is also possible to aggregate that multiple component carriers that are the same frequencies which are contiguous or non-contiguous. A frequency bandwidth of each component carrier may be a frequency bandwidth (for example, 5 MHz or 10 MHz) smaller than a frequency bandwidth (for example, 20 MHz) in which the terminal apparatus is able to perform reception, and the frequency bandwidths that are to be aggregated may be different from each other. It is desirable that the frequency bandwidth is equal to any one of the frequency bandwidths in a cell in the related art, considering backward compatibility, but may be a frequency bandwidth that is different from the frequency bandwidth in the cell in the related art.

With the carrier aggregation, component carriers (carrier types) may be aggregated that does not maintain the backward compatibility. The component carrier that does not maintain the backward compatibility is also referred to as a new carrier type (NCT). Moreover, it is desirable that the number of uplink component carriers that are allocated to (configured for or added to) the terminal apparatus by the base station apparatus is equal to or smaller than the number downlink component carriers, but limitation to this is not necessarily imposed.

The terminal apparatus and the base station apparatus manages as a primary cell (PCell) a cell that is constituted from downlink component carriers which are connected, in a cell-specific manner, to a certain uplink component carrier and the uplink component carrier. Furthermore, the terminal apparatus and the base station apparatus manage as a secondary cell (SCell) a cell that is constituted from component carriers other than those from which the primary cell is constituted. The frequency in the primary cell is referred to as a primary frequency, and the frequency in the secondary cell is referred to as a secondary frequency.

The terminal apparatus may perform reception of a paging message, detection of update of the broadcast information, an initial access procedure, configuration of security information, and the like in the primary cell, and on the other hand, may not perform these operations in the secondary cell. The primary cell and the secondary cell are collectively referred to as serving cells. That is, in a case where multiple component carriers (cells) are aggregated, the terminal apparatus retains multiple serving cells.

With regard to a state of the serving cell, a state where the serving cell is activated is also referred to as an activated state, and a state where the serving cell is deactivated is also referred to as a deactivated state. The primary cell is other than a target for control of activation and deactivation (more precisely, the primary cell is regarded as being necessarily activated), but the secondary cell retains a state of the cell, in accordance with activities, which is called the activation and the deactivation.

The state of the serving cell is also a case where a change of the state is explicitly designated (notified or indicated) by the base station apparatus, or also a case where the state is changed based on timer information (deactivation timer) that is timed by the terminal apparatus for every component carrier (cell).

Moreover, the carrier aggregation is for communication by multiple serving cells that uses multiple component carriers (frequency bands), and is also referred to as cell aggregation. Moreover, the terminal apparatus may be wirelessly connected to the base station apparatus through a relay station apparatus (or a repeater) for every frequency. That is, the base station apparatus according to each embodiment of the present invention can be replaced with the relay station apparatus.

A sequence of procedures relating to random access (a random access procedure) in the carrier aggregation is described. In the random access procedure, there are two procedures. One is a contention-based random access procedure and the other is a non-contention-based random access procedure.

The contention-based random access procedure is a random access procedure in which there is a likelihood that contention will occur between preamble sequences that are transmitted by different terminal apparatuses, and is used for initial access, which starts in a state where the terminal apparatus and the base station apparatus are not connected to each other (do not communicate with each other), a scheduling request for making a request for an uplink transmission resource, which starts in a state where the terminal apparatus and the base station apparatus are connected to each other, or the like. The contention between the preamble sequences means that multiple terminal apparatuses use the same preamble sequence and thus transmit physical random access channels using the same frequency or time resource. Moreover, the contention between the preamble sequences is referred to as random access contention.

The non-contention-based random access procedure is a random access procedure in which the contention does not occur between the preamble sequences that are transmitted different terminal apparatuses, and starts according to an instruction of the base station apparatus in a state where the terminal apparatus is connected to the base station apparatus and is out of uplink synchronization to the base station apparatus. The non-contention-based random access procedure is instructed to start, with a radio resource control (RRC) (Layer 3) layer message and control data of a physical downlink control channel (PDCCH).

The base station apparatus notifies the terminal apparatus of a preamble sequence (dedicated preamble) that is used in non-contention-based random access procedure, in a dedicated manner. The terminal apparatus selects one preamble sequence that is to be used in the contention-based random access procedure, from among preamble sequences that are not used as dedicated preambles, at the time of random access, and uses the selected preamble sequence. Among preamble sequences that is available to the terminal apparatus, the number of preamble sequences that are used in each of the contention-based random access procedure and the non-contention-based random access procedure is notified by the base station apparatus.

In the carrier aggregation, both of the non-contention-based random access procedure and the contention-based random access procedure are supported in the primary cell, but because an uplink transmission timing of the secondary cell is different from that in the primary cell, in a case where the random access procedure is executed in the secondary cell, (this is referred to as multi-TA or Multiple TA), only non-contention-based random access procedure is supported in the secondary cell. Moreover, in the carrier aggregation, a response (a random access response) to the physical random access channel (the preamble sequence) that is transmitted by the terminal apparatus in the uplink in the secondary cell is transmitted from the base station apparatus in the downlink in the primary cell.

[Dual Connectivity]

A basic architecture of the dual connectivity is described. For the dual connectivity, the terminal apparatus makes a connection to multiple base station apparatuses at the same time. Multiple base station apparatuses are constituted from base station apparatuses that constitute the macro cell and other base station apparatuses that constitute the small cell. Furthermore, the multiple base station apparatuses are constituted from base station apparatuses that constitute the small cell and other base station apparatuses that constitute a different small cell.

An connection in which, in this manner, the terminal apparatus uses radio resources in multiple cells that belong to each of the multiple base station apparatuses and thus makes a connection to a certain base station apparatus is referred to as the dual connectivity, and the connection between the terminal apparatus and the multiple base station apparatuses using a technology for realizing the dual connectivity is described using the expressions "using the dual connectivity", and "connection with the dual connectivity" and expressions similar to the expressions described above. The idea that the cell to be used for the connection is managed with a different frequency is the baseline of the present technology, but even if the cell is managed with the same frequency, it is possible to use the same technology.

Moreover, the carrier aggregation is different from the connection using the dual connectivity in that one base station apparatus manages multiple cells and thus the one base station apparatus is able to control each cell in a concentrated manner, and in that there is no need to consider an influence of delay on a backbone circuit. In other words, the carrier aggregation is a technology that connects one terminal apparatus and one base station apparatus through multiple cells, and in contrast with this, the dual connectivity is a technology that connects one terminal apparatus and multiple base station apparatuses through multiple cells.

The terminal apparatus and the base station apparatus can apply the technology that is applied to the carrier aggregation to the dual connectivity. For example, the terminal apparatus and the base station apparatus may apply technologies, such as management (addition, deletion, change, and the like) of the primary cell and the secondary cell, configuration of a measurement method and a measurement in accordance with the carrier aggregation, and activation/inactivation, to a cell that is connected using the dual connectivity.

A connection path among multiple base station apparatuses that constitute a cell that is connected using the dual connectivity is referred to as a base station interference. Furthermore, the base station interface is also referred to as an X2 interface or an Xn interface in SUTRA.

Figures 8, 9:
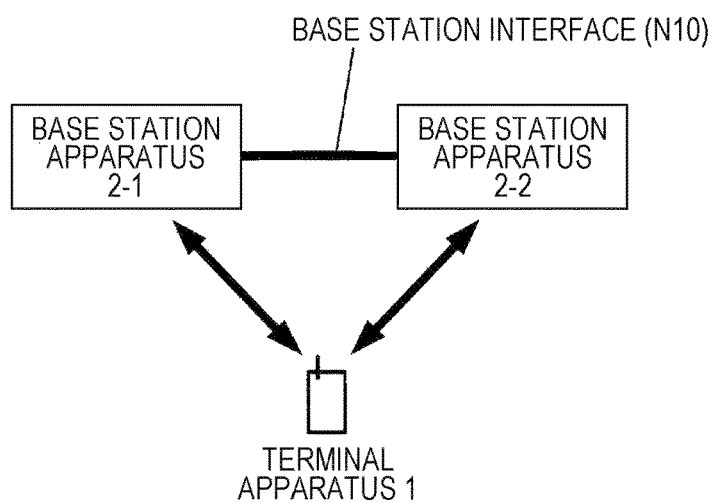
FIG. 8 is a diagram illustrating an example of a case where the terminal apparatus and the base station apparatus according to the embodiment of the present invention make connections to each other using dual connectivity.
FIG. 9 is a diagram illustrating one example of a combination of frequency bands that are supported in a terminal apparatus in the related art.

FIG. 8 is a diagram illustrating an example of a case where the terminal apparatus 1 and the base station apparatus 2 are connected using the dual connectivity. The terminal apparatus 1 and the base station apparatus 2 (a base station apparatus 2-1 and a base station apparatus 2-2) each are connected through an independent cell, and the terminal apparatus 1 is able to perform concurrent reception from and/or concurrent transmission to the cell of each base station apparatus 2. Furthermore, a base station interface N10 is connected between a base station apparatus 2-1 and the base station apparatus 2-2.

Furthermore, although the term dual connectivity is referred to, this does not mean that the number of the base station apparatuses 2 that are connected to the terminal apparatus 1 is limited to two, and the terminal apparatus 1 is also able to make connections to three or more base station apparatuses 2.

[Constitution of Capability of the Terminal Apparatus]

A constitution (a signaling architecture or a message architecture) of capability of the terminal apparatus when the terminal apparatus is able to perform communication in cells in multiple frequency bands at the same time is described.

For example, it is assumed that as radio frequencies (RFs), the terminal apparatus includes two radio frequencies (RF #1 and RF #2) and that RF #1 supports only reception (transmission) in a certain frequency band (Band #1) and RF #2 supports reception (transmission) in two different frequency bands (Band #1 and Band #5).

FIG. 9 illustrates an example of a combination of frequency bands that are supported by each of the radio frequencies of the terminal apparatus. FIG. 8 illustrates the number of combinations (RF bandCombination) in the radio frequency and frequency bands that are available for the combination. At this point, RFBandCombination #1 means that two or more different frequency bands as Band #1 are available. Furthermore, RFBandCombination #2 means that two or more frequency bands, that is, one frequency band as Band #1 and one frequency band as Band #5, are available.

Furthermore, RFBandCombination #3 means that communication which uses one or multiple frequency bands as Band #1 is possible. Furthermore, RFBandCombination #4 means that communication which uses one or multiple frequency bands as Band #5 is possible. In RF BandCombination #3 or RF BandCombination #4, the number of frequency bands in which transmission and reception are performed at the time of the carrier aggregation is designated with a separate parameter.

Figure 10:
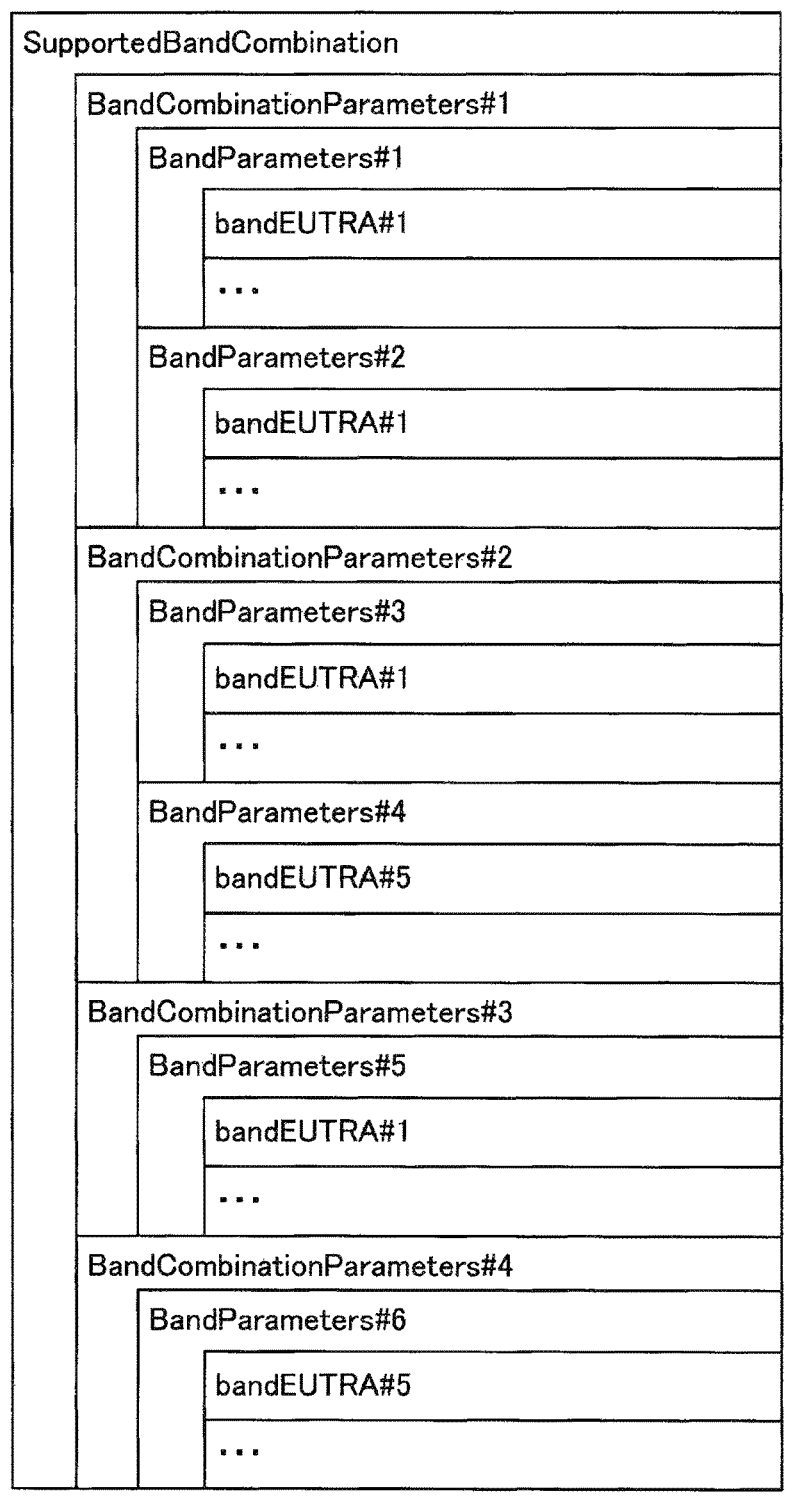
FIG. 10 is a diagram illustrating one example of an architecture of a terminal apparatus capability message in which a combination of frequency bands according to the terminal apparatus in the related art is notified.

FIG. 10 illustrates one example of an architecture of a terminal apparatus capability message that is constituted in the terminal apparatus that retains the radio frequency in FIG. 9. As terminal apparatus capability information (UE capability information), a band parameter group (BandParameters) that includes a frequency band (bandEUTRA) which is supported by each radio frequency (RF) is configured for every combination (BandCombinationParameters) of frequency bands. Furthermore, a number for specifying frequencies and bandwidths for uplink and downlink that are available for wireless communication between the base station apparatus and the terminal apparatus within a communication system is configured for the frequency band (bandEUTRA).

Descriptions of parameters other than the frequency bands are omitted in FIG. 10, but for example, information can be configured such as the number of contiguous frequency bands that are available for aggregation at the time of the carrier aggregation, or the number of Multi Input Multi Output (MIMO) layers for uplink and downlink when communication is performed with a combination of frequency bands. Moreover, the number of contiguous frequency bands that are available for aggregation at the time of the carrier aggregation may be provided as a value that is coded as support class information on the carrier aggregation. Then, a result (SupportedBandCombination) of listing combinations of all frequency bands that are possible in the terminal apparatus is constituted as the terminal apparatus capability.

In other words, a set of a frequency band (bandEUTRA) that is supportable in the terminal apparatus and terminal apparatus capability information associated with the frequency band is a parameter group (BandParameters). Furthermore, an indication of a combination of band parameter groups that are supportable in the terminal apparatus is a combination (BanaCombinationParameters) of frequency bands. Furthermore, there is a result (SupportedBandCombination) of listing combinations of frequency bands that are supportable in the terminal apparatus.

A constitution of the terminal apparatus capability that is illustrated in FIG. 10 is described in detail. BandCombinationParameters #1 includes BandParameters #1 and BandParameters #2. BandParameters #1 includes at least bandEUTRA #1, and BandParameters #2 includes at least bandEUTRA #1. By constituting the terminal apparatus capability in this manner, when performing reception (transmission) in a frequency band as Band #1, the terminal apparatus can further indicate to the base station apparatus that the terminal apparatus retains a radio frequency in which the reception (transmission) in another frequency band as Band #1 is supportable.

Furthermore, BandCombinationParameters #2 includes BandParameters #3 and BandParameters #4. BandParameters #3 includes at least bandEUTRA #1, and BandParameters #4 includes at least bandEUTRA #5. By constituting the terminal apparatus capability in this manner, when performing reception (transmission) in a frequency band as Band #1, the terminal apparatus can indicate to the base station apparatus that the terminal apparatus retains a radio frequency in which the reception (transmission) in a frequency band as Band #5 is supportable.

Furthermore, BandCombinationParameters #3 includes BandParameters #5. BandParameters #5 includes at least bandEUTRA #1. In the same manner, BandCombinationParameters #4 also includes BandParameters #6. BandParameters #5 includes at least bandEUTRA #5.

In this manner, the number of combinations of frequency bands that are included in the terminal apparatus capability message and that are supported by the terminal apparatus is equal to the number of combinations of frequency bands that are supported by the radio frequency. That is, if the number of combinations of frequency bands that are supported by the radio frequency is n (n is a natural number), the number of combinations (BandCombinationParameters) of frequency bands that are included in the terminal apparatus capability message and that are supported by the terminal apparatus is n.

Furthermore, in a case where in a combination of certain frequency bands, it is possible to support multiple uplink transmission timings, that is, in a case where in a combination of certain frequency bands, the non-contention-based random access procedure in a secondary cell is supportable, the terminal apparatus separately configures the terminal apparatus capability information (SupportedBandCombinatgion2) that results from listing the presence or absence of support of multiple uplink transmission timings for a combination of frequency bands that are supportable by the terminal apparatus.

Figure 11:
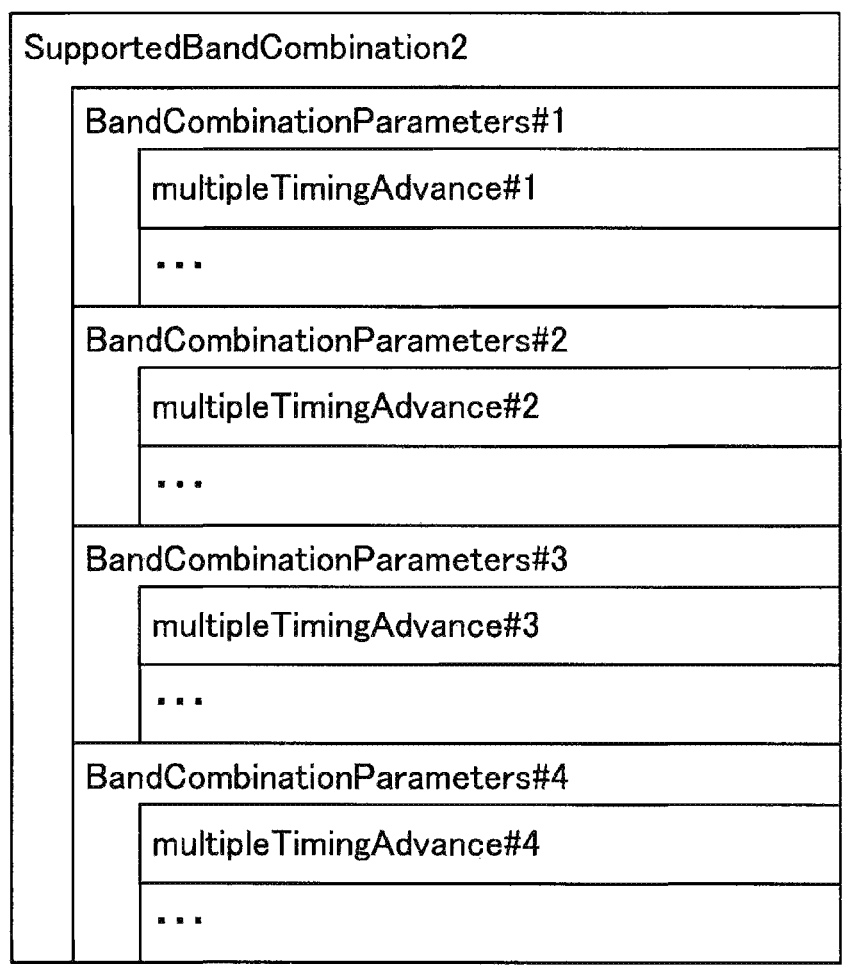
FIG. 11 is a diagram illustrating one example of the architecture of the terminal apparatus capability message in which the presence or absence of support of multiple uplink transmission timings in the terminal apparatus in the related art is notified.

FIG. 11 is a diagram illustrating one example of an architecture of the terminal apparatus capability message in which the presence or absence of the support of the multiple uplink transmission timings is configured. Information (a parameter) indicating the presence and absence of the support of the multiple uplink transmission timings is configured in such a manner as to correspond to each combination of frequency bands that are supportable in the terminal apparatus.

In an example in FIG. 11, because four combinations (BandCombinationParametes #1 to #4) of frequency bands are supportable in the terminal apparatus in FIG. 10, the information (multipleTimingAdvance) indicating the presence or absence of the support of the multiple uplink transmission timings is individually configured for every combination of frequency bands. That is, multipleTimingAdvance #1 to #4 are configured.

In this manner, the information indicating the presence or absence of the support of the multiple uplink transmission timings corresponds to combinations of frequency bands that are listed in the terminal apparatus capability message. That is, if the number of combinations of frequency bands that are listed in the terminal apparatus capability message is n (n is a natural number), a number of the information (multipleTimingAdvance) indicating the presence or absence of the support of the multiple uplink transmission timings, which is included in the terminal apparatus capability message, is n, and the sequential order that is included in the list is also individually the same. More precisely, in SupportedBandCombination, in a case where BandCombinationParameters #1 is first entered, there is also a need for BandCombinationParameters #1 to be entered first in SupportedBandCombination2.

Because these pieces of terminal apparatus capability information is seldom instantly or dynamically changed, the terminal apparatus configures the terminal apparatus capability based on the terminal apparatus capability information that is configured dynamically as a system parameter, in a non-volatile memory, configures (generates) the terminal apparatus capability message including the requisite terminal apparatus capability, as a RRC message, when connected to the base station apparatus or at the request of the base station apparatus, and transmits the resulting message to the base station apparatus.

The base station apparatus receives the terminal apparatus capability message, and based on the terminal apparatus capability that is notified, is able to suitably notify configuration information that is supportable in the radio frequency of the terminal apparatus.

Suitable embodiments of the present invention will be described in detail below referring to the accompanying drawings, while considering the matters described above. Moreover, when the embodiment of the present invention is described, in a case where it is determined that a specific description of a known function or constitution associated with the embodiment of the present invention makes the gist of the embodiment of the present invention indefinite, a detailed description thereof is omitted.

First Embodiment

A first embodiment of the present invention will be described in detail below.

FIG. 1 is a block diagram illustrating one example of the terminal apparatus 1 according to the first embodiment of the present invention. The present terminal apparatus 1 is constituted at least from a receive antenna unit R0L a reception unit 101, a demodulation unit 102, a decoding unit 103, a reception data control unit 104, a physical layer control unit 105, a transmission data control unit 106, a coding unit 107, a modulation unit 108, a transmission unit 109, a transmit antenna unit T01, and a radio resource control unit 110. The "units" in the drawings are elements that are also expressed using the terms section, circuit, constituent device, device, unit, and the like and that realize a function of the terminal apparatus 1 and each procedure.

The radio resource control unit 110 is a block that realizes each function of the radio resource control (RRC) layer that executes state control, measurement control and report control of the terminal apparatus 1, control of shared control information and dedicated control information, connection control, operation control, radio resource control, and the like. Furthermore, the reception data control unit 104 and the transmission data control unit 106 are blocks that perform each function in a medium access control (MAC) layer that manages a data link layer, a radio link control (RLC) layer, and a packet data convergence protocol (PDCP) layer.

Moreover, the terminal apparatus 1 may be constituted from multiple blocks (the reception unit 101, the demodulation unit 102, and the decoding unit 103) in a reception system and multiples blocks (the coding unit 107, the modulation unit 108, and the transmission unit 109) in a transmission system, in order that, by using the carrier aggregation and/or the dual connectivity, multiple frequencies (frequency bands or frequency bandwidth) or the concurrent reception in cells can be supported in the reception system and multiple frequencies (frequency bands or frequency bandwidth) or the concurrent transmission in cells can be supported in the transmission system. Furthermore, the terminal apparatus 1 may include multiple reception data control units 104, multiple physical layer control units 105, multiple transmission data control units 106, and multiple radio resource control units 110.

For example, the terminal apparatus 1 may be constituted in such a manner that the reception data control unit 104 and the transmission data control unit 106 correspond to each of the multiple base station apparatuses 2 (which may be categorized into a secondary base station apparatus cell group and a connectivity group) that are connected using the dual connectivity. That is, a configuration may be employed in which all or some of the MAC layer, the RLC layer, and the PDCP layer operates (performs control) with respect to each of the base station apparatuses 2 that are connected. At least, it is desirable that a function in the MAC layer can be configured for every base station apparatus (this function is referred to as multiple MAC or dual MAC). In the same manner, a configuration may be employed in such a manner that the physical layer control unit 105 or the radio resource control unit 110 operates (performs control) with respect to each of the base station apparatuses 2 that are connected.

With regard to reception processing by the terminal apparatus 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal apparatus 1.

The physical layer control information is configured by a wireless connection resource configuration that is transmitted in a dedicated manner from the base station apparatus 2 to the terminal apparatus 1, cell-specific broadcast information, a system parameter, or the like, and, if need arises, is input by the radio resource control unit 110 into the physical layer control unit 105. The physical layer control unit 105 suitably input the reception control information, which is control information relating the reception, to the reception unit 101, the demodulation unit 102, and the decoding unit 103.

Included in the reception control information are pieces of information as downlink scheduling information, such as reception frequency band information, reception timing relating to the physical channel and the physical signaling, a multiplexing method, a radio resource arrangement information. Furthermore, the reception data control information is downlink control information that includes secondary cell deactivation timer information, discontinuous reception (DRX) control information, multicast data reception information, and downlink retransmission control information. Additionally, control information relating to the downlink in each of the MAC layer, the RLC layer, and the PDCP layer are included in the reception data control information.

The reception signal is received by the receive antenna unit R01, and is input into the reception unit 101. The reception unit 101 receives a signal from the base station apparatus 2 in accordance with the frequency and the frequency band that are designated in the reception control information. The reception unit 101 may include an RF circuit. The signal that is received is input into the demodulation unit 102. The demodulation unit 102 performs demodulation of the signal. The demodulation unit 102 inputs a post-demodulation signal into the decoding unit 103. The decoding unit 103 decodes the signal that is input, and inputs each piece of data (downlink data and downlink control data) that results from the decoding, into the reception data control unit 104. Furthermore, along with each piece of data, a MAC control element that is transmitted from the base station apparatus 2 is decoded in the decoding unit 103 as well, and the decoded MAC control element is input into the reception data control unit 104.

The reception data control unit 104 performs control of the physical layer control unit 105, which is based on the received MAC control element, buffering control of each piece of data that results from the decoding, error correction control (HARQ) of data that is retransmitted, and the like. Each piece of data that is input into the reception data control unit 104 is input into (transferred to) the radio resource control unit 110.

With regard to transmission processing by the terminal apparatus 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information as uplink scheduling information, such as coding information, modulation information, the transmission frequency band information, the transmission timing relating to the physical channel and the physical signal, the multiplexing method, and the radio resource arrangement information.

Furthermore, the transmission data control information is uplink control information that includes discontinuous transmission (DTX) control information, the random access configuration information, uplink shared channel information, logical channel priority information, resource request configuration information, cell group information, uplink retransmission control information, and the like. The radio resource control unit 110 may configure multiple pieces of random access configuration information that correspond to multiple cells, respectively, for the transmission data control unit 106. Furthermore, the radio resource control unit 110 manages the transmission timing adjustment information and the transmission timing timer that are used for adjustment of the uplink transmission timing, and manages an uplink transmission timing state (the transmission timing adjusted state or the transmission unadjusted state) for every cell (every cell group or every TA group). The transmission timing adjustment information and the transmission timing timer are included in the transmission data control information.

Moreover, there is a need to manage multiple uplink transmission timing states (Multi-TA), the transmission data control unit 106 manages the transmission timing adjustment information that corresponds to the uplink transmission timing in each of the multiple cells (the cell group or the TA group). Included in the resource element configuration information are at least maximum transmission counter configuration information and radio resource request prohibition timer information. The radio resource control unit 110 may configure multiple pieces of resource request configuration information that correspond to multiple cells, respectively, in the transmission data control unit 106.

Pieces of transmission data (the uplink data and the uplink control data) that are originated in the terminal apparatus 1 are input from the radio resource control unit 110 into the transmission data control unit 106 at an arbitrary timing. At this time, the transmission data control unit 106 calculates an amount of transmission data (an amount of uplink buffer) that is input. Furthermore, the transmission data control unit 106 has a function of determining whether the transmission data that is input is data that belongs to the control-plane or is data that belongs to the user-plane.

Furthermore, when the transmission data is input into the transmission data control unit 106, the transmission data control unit 106 stores the transmission data in an uplink buffer of the transmission data control unit 106 (not illustrated). Then, the transmission data control unit 106 determines the radio resource indispensable for the transmission for the transmission data that is input, is allocated to the terminal apparatus 1. The transmission data control unit 106 selects any one of the radio resource request (the scheduling request (SR)) that uses the physical uplink shared channel (PUSCH) and the physical uplink control channel (PUCCH) and the radio resource request that uses the physical random access channel, based on radio resource allocation, and makes a request to the physical layer control unit 105 for control processing for transmitting the selected channel.

That is, when the radio resource is already allocated and the transmission data is in a state of being able to be transmitted on the physical uplink shared channel (PUSCH), in accordance with the instruction of the radio resource control unit 110, the coding unit 107 acquires the transmission data corresponding to the already-allocated radio resource from the uplink buffer and coded the acquired transmission data, and inputs a result of the coding into the modulation unit 108. Furthermore, when the radio resource is not allocated, if the radio resource request by the physical uplink control channel is possible, in accordance with the instruction of the radio resource control unit 110, the coding unit 107 codes the control data indispensable for the transmission of the radio resource request on the physical uplink control channel and inputs a result of the coding into the modulation unit 108.

Furthermore, when the radio resource is not allocated, if the radio resource request by the physical uplink control channel is not possible, the coding unit 107 instructs the transmission data control unit 106 to start the random access procedure. At this time, based on the random access configuration information that is input from the transmission data control unit 106, the coding unit 107 generates the preamble sequence that is transmitted on the physical random access channel. Furthermore, in accordance with the transmission control information, the coding unit 107 suitably codes each piece of data and inputs a result of the coding into the modulation unit 108.

Based on a channel structure in which each piece of coded data is transmitted, the modulation unit 108 performs suitable modulation processing. Along with mapping each piece of data being modification-processed to the frequency domain, the transmission unit 109 converts a signal in the frequency domain into a signal in the time domain, impresses the resulting signal on a carrier wave in the existing frequency, and performs power amplification. In accordance with the transmission timing adjustment information for every cell (every cell group or every TA group) that is input from the radio resource control unit 110, the transmission unit 109 further adjusts the uplink transmission timing. The transmission unit 109 may include the RF circuit. A transmission signal that is output from the transmission unit 109 is transmitted from the transmit antenna unit T01. The physical uplink shared channel in which the uplink control data is arranged is also able to include, for example, the layer 3 message (the radio resource control message and the RRC message) in addition to the user data.

Other constituent elements of the terminal apparatus 1 and a transfer path for data (the control information) between the constituent elements are omitted in FIG. 1, but it is apparent that multiple blocks that have other functions indispensable for the terminal apparatus 1 to operate are retained as constituent elements. For example, a NAS layer unit that executes control with a core network, or an application layer unit is present above the radio resource control unit 110.

Furthermore, the receive antenna unit R01 or the transmit antenna unit T01 is typically a planar multi-band antenna, but can be constituted by employing an arbitrary antenna suitable for the terminal apparatus capability, the shape, the purpose and the like of the terminal apparatus 1. For example, the receive antenna unit R01 or the transmit antenna unit T01 may be constituted from multiple antenna units or may have directivity. Furthermore, the receive antenna unit R01 and the transmit antenna unit T01 may be integrated into one piece.

Furthermore, as described above, in a case where the terminal apparatus 1 includes the multiple reception data control units 104, the multiple physical layer control units 105, the multiple transmission data control units 106, and the multiple radio resource control units 110, each of the control information, the downlink control data, the downlink data, the uplink control data, and the uplink data is one relating to the base station apparatus 2 to which each group corresponds. For example, a signal that is received from the base station apparatus 2-1 is input into the reception data control unit 104 that corresponds to the base station apparatus 2-1, but the signal that is received from the base station apparatus 2-1 is not input into the reception data control unit 104 that corresponds to the base station apparatus 2-2.

Figure 2:
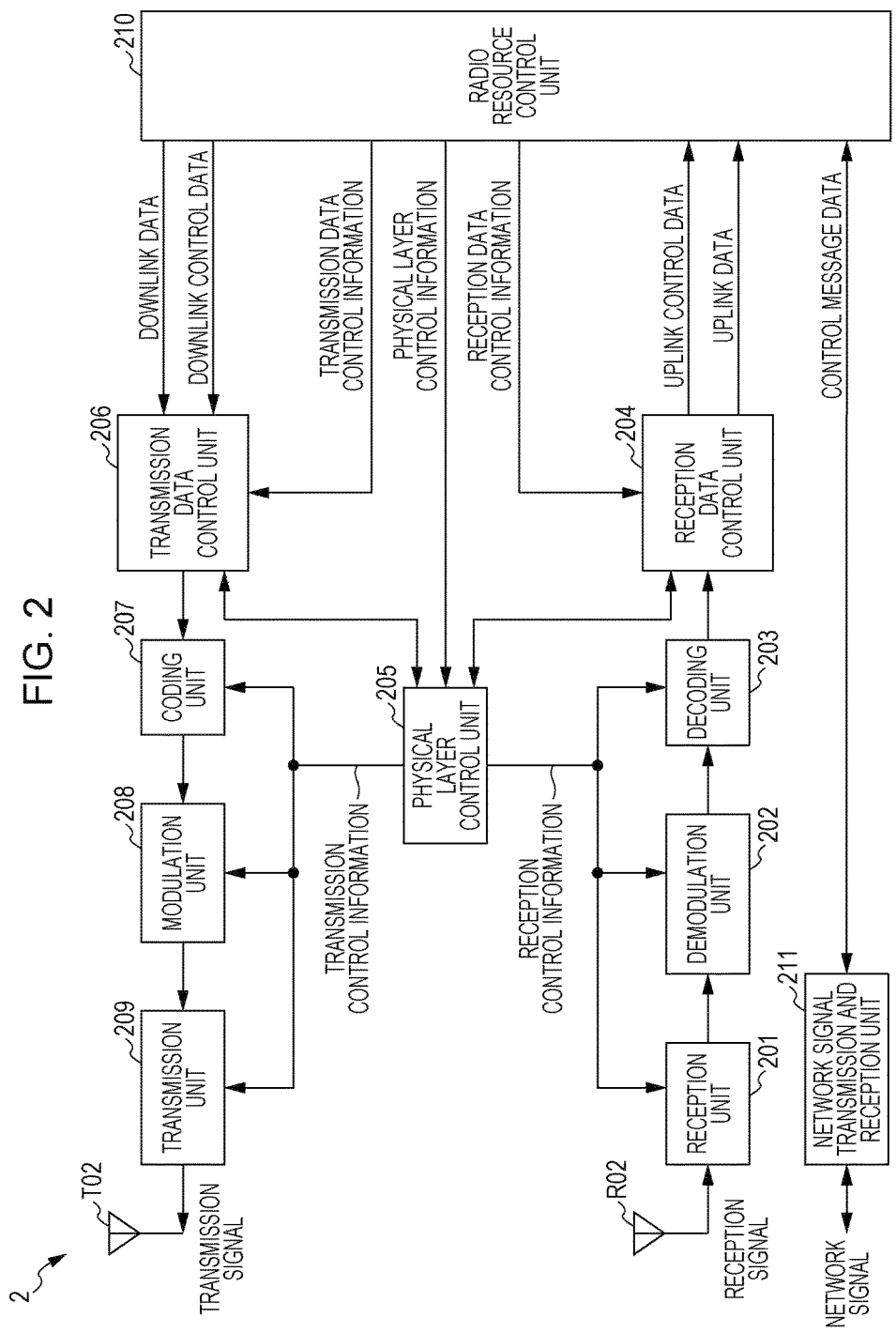
FIG. 2 is a block diagram illustrating one example of a schematic constitution of a base station apparatus according to the embodiment of the present invention.

FIG. 2 is a block diagram illustrating one example of the base station apparatus 2 according to the first embodiment of the present invention. The present base station apparatus is constituted at least from a receive antenna unit R02, a reception unit 201, a demodulation unit 202, a decoding unit 203, a reception data control unit 204, a physical layer control unit 205, a transmission data control unit 206, a coding unit 207, a modulation unit 208, a transmission unit 209, a transmit antenna unit T02, a radio resource control unit 210, a network signal transmission and reception unit 211. The "units" in the drawings are elements that are also expressed using the terms section, circuit, constituent device, device, unit, and the like and that perform a function of the base station apparatus 2 and execute each procedure.

The radio resource control unit 210 is a block that performs the radio resource control (RRC) that executes the radio resource control of the base station apparatus 2. Furthermore, the reception data control unit 204 and the transmission data control unit 206 are blocks that perform each function in the medium access control (MAC) layer that manages the data link layer, the radio link control (RLC) layer, and the packet data convergence protocol (PDCP) layer.

Moreover, the base station apparatus 2 may be constituted from multiple blocks (the reception unit 201, the demodulation unit 202, and the decoding unit 203) in the reception system and multiples blocks (the coding unit 207, the modulation unit 208, and the transmission unit 209) in the transmission system, in order that, by using the carrier aggregation and/or the dual connectivity, multiple frequencies (frequency bands or frequency bandwidth) are supported. Furthermore, the base station apparatus 2 may include multiple reception data control units 204, multiple physical layer control units 205, multiple transmission data control units 206, multiple radio resource control unit 210, and multiple network signal transmission and reception unit 211.

The radio resource control unit 210 inputs the downlink data and the downlink control data into the transmission data control unit 206. In a case where the MAC control element that is to be transmitted to the terminal apparatus 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the signal that is modulated in the modulation unit 208 is input into the transmission unit 209. After mapping each piece of data being input to the frequency domain, the transmission unit 209 converts a signal in the frequency domain into a signal in the time domain, impresses the resulting signal on a carrier wave in the existing frequency, and performs the power amplification. The transmission unit 209 may include the RF circuit. A transmission signal that is output from the transmission unit 209 is transmitted from the transmit antenna unit T02. The physical downlink shared channel in which the downlink control data is arranged typically constitutes the layer 3 message (the RRC message)_.

Furthermore, the reception signal is received by the receive antenna unit R02, and is input into the reception unit 201. The reception unit 201 converts the signal that is received from the terminal apparatus 1 into a digital signal in a baseband. In a case where a cell at multiple different transmission timings are configured for the terminal apparatus 1, the reception unit 201 receives the signal at different timings for every cell (every cell group or every TA group). The digital signal that results from the conversion in the reception unit 201 is input into the demodulation unit 202 and is demodulated.

The signal that results from the demodulation in the demodulation unit 202 is subsequently input into the decoding unit 203. The decoding unit 203 decodes the signal that is input, and inputs each piece of data (uplink data and uplink control data) that results from the decoding, into the reception data control unit 204. Furthermore, along with each piece of data, the MAC control element that is transmitted from the terminal apparatus 1 is decoded in the decoding unit 203 as well, and the decoded MAC control element is input into the reception data control unit 204.

The reception data control unit 204 performs control of the physical layer control unit 205, which is based on the received MAC control element, performs buffering of each piece of data that results from the decoding, and performs the error correction control (HARQ) of data that is retransmitted. Each piece of data that is input into the reception data control unit 204 is input into (transferred to) the radio resource control unit 210.

The physical layer control information that is indispensable for these type of control of each block is information that is constituted from reception control information and transmission control information and that includes a parameter configuration indispensable for wireless communication control by the base station apparatus 2. The physical layer control information is configured by a higher-level network apparatus (an MME, a serving gateway (SGW), an OAM, or the like) or a system parameter, and, if need arises, is input by the radio resource control unit 210 into the control unit 204.

The physical layer control unit 205 inputs the physical layer control information associated with the transmission, as the transmission control information, into each block, that is, the coding unit 207, the modulation unit 208, and the transmission unit 209, and suitably inputs the physical layer control information associated with the reception, as the reception control information, into each block, that is, the reception unit 201, the demodulation unit 202, and the decoding unit 203.

Included in the reception data control information is the control information relating to the uplink, of the terminal apparatus 1 for each of the MAC layer, the RLC layer, and the PDCP layer of the base station apparatus 2. Furthermore, included in the transmission data control information is the control information relating to the downlink, of the terminal apparatus 1 for each of the MAC layer, the RLC layer, and the PDCP layer of the base station apparatus 2. That is, the reception data control information and transmission data control information are configured for every terminal apparatus 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path for data (the control information) between the constituent elements are omitted in FIG. 2, but it is apparent that multiple blocks that have other functions indispensable for the base station apparatus 2 to operate are retained as constituent elements. For example, a radio resource management unit or an application unit is present over the radio resource control unit 210.

Furthermore, the receive antenna unit R02 or the transmit antenna unit T02 is typically a planar multi-band antenna, but can be constituted by employing an arbitrary antenna suitable for the transmission capability, the shape, the purpose and the like of the base station apparatus 2. For example, the receive antenna unit R02 or the transmit antenna unit T02 may be constituted from multiple antenna units or may have directivity. Furthermore, the receive antenna unit R02 and the transmit antenna unit T02 may be integrated into one piece. Additionally, the receive antenna unit R02 and the transmit antenna unit T02 (as well as the reception unit 201 and the transmission unit 209) may be constituted as one unit (a remote radio head (RRH)) that is independent from the base station apparatus 2, and may be arranged at a different position than the base station apparatus 2.

Figures 3, 4:
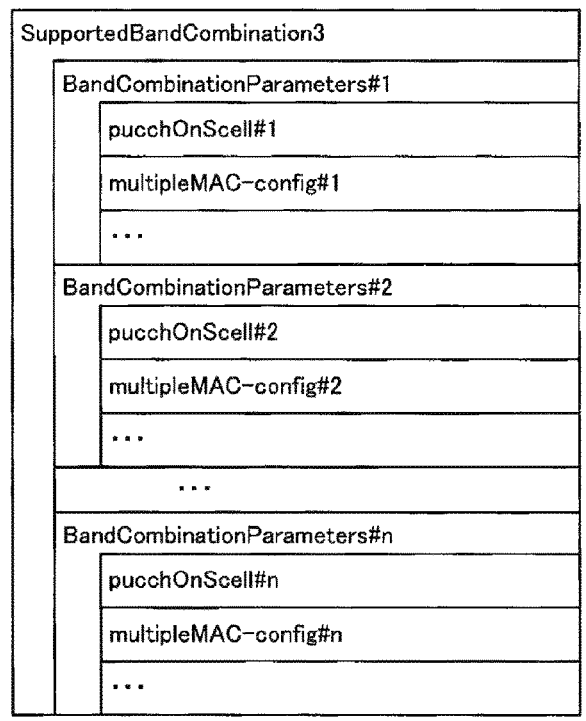
FIG. 3 is a diagram illustrating an architecture of a terminal apparatus capability message according to a first embodiment of the present invention.
FIG. 4 is a diagram illustrating a relationship between multiple pieces of terminal apparatus capability information and a function that is included in a terminal apparatus, according to the first embodiment of the present invention.

FIG. 3 is a diagram illustrating one example of an architecture of the terminal apparatus capability message in a case where the terminal apparatus 1 notifies multiple pieces of terminal apparatus capability information (parameters) that are based on a communication scheme that is supported, for every combination for frequency bands that is supported by the terminal apparatus 1, in order to indicate to the base station apparatus 2 that a communication scheme including the dual connectivity is supported.

Moreover, the term "support" means that hardware, software, and/or the like indispensable for realizing the function (or the communication scheme) is built into the terminal apparatus 1 and passes a conformance test (a specification authentication test) that is stipulated in 3GPP.

In FIG. 3, as the terminal apparatus capability information (the parameter) indicating that the terminal apparatus 1 supports multiple communication schemes including the dual connectivity, the terminal apparatus 1 adds information that indicates the presence or absence (pucchOnScell) of transmission support of the physical uplink control channel in the secondary cell and whether or not to perform multiple data transfer control operations.

The information indicating whether or not to perform the multiple data transfer control operations may mean information indicating the presence or absence (multiple MAC-Config (or dualMAC-Config)) of multiple supports (Multiple MAC (Dual MAC)) of the function of the MAC layer. The multiple supports of the function of the MAC layer may mean that in a case where the primary cell and the secondary cell are cells that belong to different groups (a cell group, a base station apparatus group, and a connectivity group), each function that is performed by the MAC layer is independently performed in each of the groups. More specifically, the multiple supports of the MAC layer means that an amount of buffer that is used for a buffer situation report in the MAC layer is calculated independently in each of the groups and that a radio resource request procedure in the MAC layer is performed independently in each of the groups.

Then, these pieces of terminal apparatus capability information are listed for every combination (BandCombinationParameters #1 to #n) of frequency bands that are supported by the terminal apparatus 1, and is included, as additional terminal apparatus capability (SupportedBandCombination3), in the terminal apparatus capability message.

Moreover, it is assumed that multiple pieces of terminal apparatus capability information that are included in SupportedBandCombination3 is equal to the number of combinations of frequency bands that are supported by the terminal apparatus 1, which is configured with SupportedBandCombination, and it is assumed that the sequential order thereof is consistent. That is, if the number of combinations of frequency bands that are listed in the terminal apparatus capability message is n (n is a natural number), the number of multiple pieces of terminal apparatus capability information (pucchOnScell and multiple MAC-Config) that is included in the terminal apparatus capability message is also n (n sets), and the sequential number that is included in the list is also the same.

As a value of the terminal apparatus capability information, Supported or True is configured in a case where support is indicated. Furthermore, as the value of the terminal apparatus capability information, Not Supported, False, or Null is configured in a case where non-support is indicated.

FIG. 4 is a diagram for describing a relationship between multiple pieces of terminal apparatus capability information that are configured in the terminal apparatus capability message in FIG. 3 and a communication method that is supportable in the terminal apparatus 1. A check mark (a tick) in the drawing indicates that the capability which is indicated by the terminal apparatus capability information is supported by the terminal apparatus 1, and a mark (−), that is, a horizontal bar in the drawing, indicates information other than this.

As communication methods that are supportable by the terminal apparatus 1 in a combination of certain frequency bands, a communication method (Case 1) that uses the carrier aggregation, a communication method (Case 2) that uses the carrier aggregation and multiple uplink transmission timings (Multi-TA), a communication method (Case 3) that uses the carrier aggregation and transmission (SCell PUCCH) of the physical uplink control channel in the secondary cell, a communication method (Case 4) that uses the carrier aggregation, the multiple uplink transmission timings (Multi-TA), and the transmission (SCell PUCCH) of the physical uplink control channel in the secondary cell, and a communication method (Case 5) that uses the dual connectivity are considered.

The terminal apparatus 1 is able to notify the base station apparatus 2 of Case 1 and Case 2 using terminal apparatus capability information (BandCombinationParameters or multipleTimingAdvance) in the related art.

Case 3 to Case 5 correspond to communication methods, respectively, that the terminal apparatus 1 according to the present embodiment is able to notify the base station apparatus 2 of.

The communication method, Case 3, indicates that the terminal apparatus 1 is able to make a connection to one base station apparatus 2 at all times, but that a transmission configuration of the physical uplink control channel (PUCCH) for the secondary cell is able to be configured for the terminal apparatus 1. In other words, Case 3 indicates that the terminal apparatus 1 supports a configuration (a procedure) relating to the carrier aggregation in the related art, and on the other hand, does not support a configuration (a procedure) relating to the dual connectivity. Furthermore, Case 3 indicates that the terminal apparatus 1 does not support a configuration (a procedure) indispensable for multiple uplink transmission timings.

The transmission configuration of the physical uplink control channel (PUCCH) for the secondary cell, for example, includes some or all of a configuration in a case where an ACK/NACK or a CQI is transmitted in the secondary cell, a configuration relating to the radio resource request procedure in the secondary cell, and the like.

The configuration relating to the dual connectivity, for example, includes some or all of a configuration for supporting the contention-based random access procedure in the secondary cell, a configuration for supporting a DRX procedure different from that in the primary cell, in the secondary cell, a configuration for monitoring a radio link in the secondary cell, a configuration for categorizing serving cells into base station apparatus cell groups or connectivity groups, a configuration relating to functions of multiple MAC layers or RLC layers that correspond to the secondary base station apparatus cell group, and the like.

Case 4 indicates that the terminal apparatus 1 is able to make a connection to one base station apparatus 2 at all times as in Case 3, but that the transmission configuration of the physical uplink control channel (PUCCH) for the secondary cell is able to be configured for the terminal apparatus 1 and communication at multiple uplink transmission timings is supported during the carrier aggregation. In other words, Case 4 indicates that the terminal apparatus 1 supports the configuration relating to the carrier aggregation in the related art is supported, and on the other hand, does not support the configuration relating to the dual connectivity. Furthermore, Case 4 indicates that the terminal apparatus 1 supports multiple uplink transmission timings during the carrier aggregation.

Case 5 indicates that the terminal apparatus 1 supports all functions indispensable for the dual connectivity. That is, in a case where the carrier aggregation is possible in a combination of certain frequency bands, the communication at multiple uplink transmission timings is possible in the combination of certain frequency bands, the transmission of the physical uplink control channel for the secondary cell is possible, and the multiple supports of the function of the MAC layer is possible, the terminal apparatus 1 is able to configure information indicating that the support is available for all associated pieces of terminal apparatus capability information.

Moreover, as one example of the terminal apparatus capability information according to the present embodiment, the information indicating the multiple supports of the function of the MAC layer are described as the information indicating whether or not the multiple data transfer control operations that are independent of the group are performed, but instead, it is also possible to use pieces of terminal apparatus capability information indicating other meanings.

For example, the terminal apparatus 1 may use information (multipleL2-Config) indicating that multiple L2 functions in accordance with the base station apparatus 2 are supported. Furthermore, the terminal apparatus 1 may use information (SCG-Config) indicating that the cell group (the secondary base station apparatus cell group (SCG)) of the base station apparatus 2 that includes only the secondary cell is supported. Furthermore, the terminal apparatus 1 may use information (SupportedMultipleConnection) indicating that connections to multiple base station apparatuses 2 are supported.

With this configuration, the terminal apparatus 1 and the base station apparatus 2 according to the first embodiment can associate the terminal apparatus capability that is retained by the terminal apparatus 1 and the communication scheme that is supported by the terminal apparatus 1 with each other.

The terminal apparatus 1 according to the present embodiment can individually notify the base station apparatus 2 of the terminal apparatus capability that indicates the support of the communication scheme including the dual connectivity for every combination of frequency bands. This is an efficient notification method in a case where there is a combination frequency bands that do not support a certain communication scheme. For example, this is efficient in a case where in a combination of certain frequency bands, the terminal apparatus 1 supports the communication with the carrier aggregation, but does not support the communication with the dual connectivity. Furthermore, based on the information relating to the terminal apparatus capability that is notified by the terminal apparatus 1, the base station apparatus 2 according to the present embodiment can know the communication scheme that is supported by the terminal apparatus 1, for every combination frequency bands.

According to the first embodiment, by using multiple pieces of terminal apparatus capability information, the terminal apparatus 1 is able to suitably notify the base station apparatus 2 of the communication method and the function that are supported by the terminal apparatus 1 for every combination of frequency bands, and can cause the base station apparatus 2 to select an optimal communication method. Furthermore, because the terminal apparatus capability that is based on the communication method which is supported by the terminal apparatus 1 is notified for every combination of frequency bands, for the terminal apparatus 1, the base station apparatus 2 can select and suitably designate an efficient communication method in accordance with an amount of traffic, a cell arrangement of the base station apparatus 2, or the like.

Second Embodiment

A second embodiment of the present invention will be described.

According to the first embodiment, multiple functions of the terminal apparatus 1 that relate to the dual connectivity are newly configured for every combination of frequency bands. Thus, it is possible to notify an available communication scheme for every combination of frequency bands. However, the combination of frequency bands that are supported depends on hardware configuration of the terminal apparatus 1, but on the other hand, the communication methods, such as the dual connectivity, the multiple uplink transmission timings (Multi-TA), and the transmission (SCell PUCCH) of the physical uplink control channel in the secondary cell, do not depend on the hardware configuration.

Accordingly, according to the second embodiment, a method is described in which the communication scheme that is supported by the terminal apparatus 1 is notified by configuring the terminal apparatus capability information that is independent of the combination of frequency bands. A terminal apparatus 1 and a base station apparatus 2 according to the second embodiment may have the same constitution as illustrated in FIGS. 1 and 2.

FIG. 5 is a diagram illustrating one example of an architecture of the terminal apparatus capability message in a case where the terminal apparatus 1 notifies multiple pieces of terminal apparatus capability information (parameters) that are based on the communication scheme which is supported, in order to indicate to the base station apparatus 2 that the communication method including the dual connectivity is supported.

In FIG. 5, as the terminal apparatus capability information (the parameter) indicating that the terminal apparatus 1 supports the multiple communication schemes including the dual connectivity, the terminal apparatus adds the information that indicates the presence or absence (pucchOnScell) of the transmission support of the physical uplink control channel in the secondary cell and the presence or absence (multipleMAC-Confg(dualMAC-Config)) of the multiple supports (multipleMAC-Config (dualMAC-Config)) of the function of the MAC layer. Unlike in the first embodiment, these pieces of terminal apparatus capability information are applied to a combination of all frequency bands that are supported by the terminal apparatus 1.

Information (pucchOnScell) indicating the presence or absence of the transmission support of the physical uplink control channel in the secondary cell, for example, may be included in a physical layer parameter group (PhyLayerParameters2) that is newly added according to the present embodiment. Furthermore, the presence or absence (multipleMAC-Config) of the multiple supports of the function of the MAC layer, for example, may be included in another parameter group (otherParameters2) that is newly added according to the present embodiment. The terminal apparatus 1 transmits these pieces of terminal apparatus capability information to the base station apparatus 2, with the pieces of terminal apparatus capability information being included in the terminal apparatus capability message.

In a case where the transmission of the physical uplink control channel in the secondary cell (a value of pucchOnScell is Supported) is supported, it is indicated that, in the combination of all frequency bands that are supported by the terminal apparatus 1, at the same time that the carrier aggregation is performed, the terminal apparatus 1 supports the communication method (Case 3 in FIG. 4) uses the transmission (SCell PUCCH) of the physical uplink control channel in the secondary cell.

Additionally, in the combination of all frequency bands in which multiple uplink transmission timings (Multi-TA) are supported, it is indicated that the terminal apparatus 1 supports the communication method (Case 4 in FIG. 4) that uses the carrier aggregation, the multiple uplink transmission timings (Multi-TA), and the transmission (SCell PUCCH) of the physical uplink control channel in the secondary cell.

Furthermore, in a case where the function of the MAC layer is multi-supported (a value of multipleMAC-Config is Supported, it is indicated that, in the combination of all frequency bands that are supported by the terminal apparatus 1, the terminal apparatus 1 supports the communication (Case 5 in FIG. 4) that uses the dual connectivity).

Moreover, even in the case where the function of the MAC layer is multi-supported (the value of multipleMAC-Config is Supported), it may be indicated that, in the combination of frequency bands in which the multiple uplink transmission timings (Multi-TA) are not supported, the terminal apparatus 1 does not support the communication method that uses the dual connectivity. Furthermore, it may be indicated that in the combination of frequency bands at a frequency, the terminal apparatus 1 does not support the communication method that uses the dual connectivity.

In other words, in the case where the function of the MAC layer is multi-supported (the value of multipleMAC-Config is Supported), it may be indicated that, in the combination of frequency bands at a different frequency in which the multiple uplink transmission timings (Multi-TA) are supported, the terminal apparatus 1 support the communication method (Case 5 in FIG. 4) that uses the dual connectivity.

With this configuration, the terminal apparatus 1 and the base station apparatus 2 according to the second embodiment can associate the terminal apparatus capability that is retained by the terminal apparatus 1 and the communication scheme that is supported by the terminal apparatus 1 with each other, with a less amount of information than in the first embodiment.

The terminal apparatus 1 according to the present embodiment can individually notify the base station apparatus 2 of the terminal apparatus capability that indicates the support of the communication scheme including the dual connectivity, independently of the combination of frequency bands. This is an efficient notification method in a case where the communication scheme that is supported by the terminal apparatus 1 can be applied in a shared manner as to the combination of frequency hands. Furthermore, based on the information relating to the terminal apparatus capability that is notified by the terminal apparatus 1, the base station apparatus 2 according to the present embodiment can know the communication scheme that is supported by the terminal apparatus 1.

According to the second embodiment, by using multiple pieces of terminal apparatus capability information, the terminal apparatus 1 is able to suitably notify the base station apparatus 2 of the communication method and the function that are supported by the terminal apparatus 1 and can cause the base station apparatus 2 to select an optimal communication method. Furthermore, because the terminal apparatus capability that is based on the communication method which is supported by the terminal apparatus 1 is notified, for the terminal apparatus 1, the base station apparatus 2 can select and suitably designate an efficient communication method in accordance with an amount of traffic, a cell arrangement of the base station apparatus 2, or the like.

Third Embodiment

A third embodiment of the present invention will be described below.

Accordingly, according to the first embodiment and the second embodiment, the method is described in which the communication scheme that is supported by the terminal apparatus 1 is notified with the multiple pieces of terminal apparatus capability information. However, if multiple values can be configured for the terminal apparatus capability information, the same effect can be obtained even without using the multiple pieces of terminal apparatus capability information.

Accordingly, according to the third embodiment, a method is described in which the communication scheme that is supported by the terminal apparatus 1 is notified by adding the terminal apparatus capability information for which the multiple values are selected. A terminal apparatus 1 and a base station apparatus 2 according to the third embodiment may have the same constitution as illustrated in FIGS. 1 and 2.

FIG. 6 is a diagram illustrating one example of the architecture of the terminal apparatus capability message in the case where the terminal apparatus 1 notifies the multiple pieces of terminal apparatus capability information (parameters) that are based on the communication scheme which is supported, in order to indicate to the base station apparatus 2 that the communication scheme including the dual connectivity is supported.

In FIG. 6, as the terminal apparatus capability information (the parameter) indicating that the terminal apparatus 1 supports the multiple communication schemes including the dual connectivity, the terminal apparatus 1 adds information (pucchOnScell-Connectivity) that indicates whether or not the physical uplink control channel is able to be transmitted to each of the multiple base station apparatuses 2. In other words, this information indicates whether or not the physical uplink control channel is able to be transmitted in the secondary cell during the carrier aggregation, or whether or not the physical uplink control channel is able to be transmitted in the secondary cell during the carrier aggregation and the secondary cell during the dual connectivity.

Moreover, as in the first embodiment, the terminal apparatus capability information may be configured for every combination of frequency bands that are supported by the terminal apparatus 1. Alternatively, as in the second embodiment, one piece of terminal apparatus capability information may be applied to the combination of all frequency bands that are supported by the terminal apparatus 1.

Information (pucchOnScell-Connectivity) indicating whether or not the physical uplink control channel is able to be transmitted to each of the multiple base station apparatuses 2, for example, may be included in the physical layer parameter group (PhyLayerParameters2) that is newly added according to the present embodiment.

As a value that the present terminal apparatus capability information (pucchOnScell-Connectivity) can take, a value (for example, Single) indicating that the transmission of the physical uplink control channel in the secondary cell is supported with a method other than the communication method that uses the dual connectivity, or a value (for example, Dual) indicating that the transmission of the physical uplink control channel in the secondary cell is supported with the communication method that uses the dual connectivity may be configured.

FIG. 7 is a diagram for describing a relationship between multiple pieces of terminal apparatus capability information that are configured in the terminal apparatus capability message in FIG. 6 and a communication method that is supportable in the terminal apparatus 1. What distinguishes FIG. 7 from FIG. 4 will be described below.

Case 3 to Case 5 correspond to communication methods, respectively, that the terminal apparatus 1 according to the present embodiment is able to notify the base station apparatus 2 of.

In a case where a function for the transmission of the physical uplink control channel to each of the multiple base station apparatuses 2 is not supported (a value of pucchOnScell-Connectivity is Single), it is indicated that, in the combination of all frequency bands that are supported by the terminal apparatus 1, at the same time that the carrier aggregation is performed, the terminal apparatus 1 supports the communication method (Case 3 in FIG. 7) uses the transmission (SCell PUCCH) of the physical uplink control channel in the secondary cell.

Additionally, in the combination of all frequency bands in which multiple uplink transmission timings (Multi-TA) are supported, it is indicated that the terminal apparatus 1 supports the communication method (Case 7 in FIG. 4) that uses the carrier aggregation, the multiple uplink transmission timings (Multi-TA), and the transmission (SCell PUCCH) of the physical uplink control channel in the secondary cell.

Furthermore, in a case where the function for the transmission of the physical uplink control channel to each of the multiple base station apparatuses 2 is supported (the value of pucchOnScell-Connectivity is Dual), it is indicated that, in the combination of all frequency bands that are supported by the terminal apparatus 1, the terminal apparatus 1 supports the communication scheme (Case 5 in FIG. 7) that uses the dual connectivity.

Moreover, even in the case where the function for the transmission of the physical uplink control channel to each of the multiple base station apparatuses 2 is supported (the value of pucchOnScell-Connectivity is Dual), it may be indicated that, in the combination of frequency bands in which the multiple uplink transmission timings (Multi-TA) are not supported, the terminal apparatus 1 does not support the communication method that uses the dual connectivity. Furthermore, it may be indicated that in the combination of frequency bands at a frequency, the terminal apparatus 1 does not support the communication method that uses the dual connectivity.

Moreover, as one example of the terminal apparatus capability information according to the present embodiment, the information (pucchOnScell-Connectivity) indicating whether or not the physical uplink control channel is able to be transmitted to each of the multiple base station apparatuses 2 is described, but instead, it is also possible to use pieces of terminal apparatus capability information indicating other meanings.

For example, the terminal apparatus 1 may use information (pucchOnScellGroup) indicating the cell group in which the transmission of the physical uplink control channel is possible. As a value that the present terminal apparatus capability information (pucchOnScellGroup) can take, a value (for example, MCG) indicating that the transmission of the physical uplink control channel in the secondary cell is supported in the cell group of the base station apparatus 2 (which is also referred to as a master base station apparatus (MeNB)) that constitutes the macro cell, or a value (for example, SCG) indicating that the transmission of the physical uplink control channel in the secondary cell is supported in the cell group of the base station apparatuses 2 (which is also referred to as a secondary base station apparatus (SeNB)) may be configured.

With this configuration, the terminal apparatus 1 and the base station apparatus 2 according to the third embodiment can associate the terminal apparatus capability that is retained by the terminal apparatus 1 and the communication scheme that is supported by the terminal apparatus 1 with each other, using one piece of terminal apparatus capability information.

The terminal apparatus 1 according to the present embodiment can individually notify the base station apparatus 2 of the terminal apparatus capability that indicates the support of the communication scheme including the dual connectivity, independently of the combination of frequency bands. This is an efficient notification method in the case where the communication scheme that is supported by the terminal apparatus 1 can be applied in a shared manner as to the combination of frequency bands. Furthermore, based on the information relating to the terminal apparatus capability that is notified by the terminal apparatus 1, the base station apparatus 2 according to the present embodiment can know the communication scheme that is supported by the terminal apparatus 1.

According to the third embodiment, by using one piece of terminal apparatus capability information, the terminal apparatus 1 is able to suitably notify the base station apparatus 2 of the communication method and the function that are supported by the terminal apparatus 1 and can cause the base station apparatus 2 to select an optimal communication method. Furthermore, because the terminal apparatus capability that is based on the communication method which is supported by the terminal apparatus 1 is notified, for the terminal apparatus 1, the base station apparatus 2 can select and suitably designate an efficient communication method in accordance with an amount of traffic, a cell arrangement of the base station apparatus 2, or the like.

Furthermore, it is considered that one radio bearer which transfers control data or user data is transferred through a different base station apparatus 2 (this is referred to as bearer split), and the terminal apparatus 1 may add terminal apparatus capability information corresponding to this function. For example, according to the first to third embodiments, the terminal apparatus 1 may additionally transfer terminal apparatus capability information indicating whether or not the bearer split is possible, or may transmit this terminal apparatus capability information instead of either terminal apparatus capability information (or either combination of these pieces of terminal apparatus capability information).

Furthermore, for example, the terminal apparatus 1 may additionally transfer terminal apparatus capability indicating a correspondence to an architecture in which the bearer split is possible, or instead, may transmit this terminal apparatus capability instead of either terminal apparatus capability information (or either combination of these pieces of terminal apparatus capability information). The terminal apparatus capability indicating the architecture indicates that either of a first architecture that does not support the bearer split and a second architecture that supports the bearer split is supported or both of them are supported.

Furthermore, terminal apparatus capability indicating a correspondence to a case where resources of cells in an FDD band and a TDD band are aggregated (TDD-FDD Joint Operation) and used, or indicating a non-correspondence to the case may be added, or may transmit this terminal apparatus capability instead of either terminal apparatus capability. The terminal apparatus 1 may add terminal apparatus capability information corresponding to this function. For example, according to the first to third embodiments, the terminal apparatus 1 may additionally transfer terminal apparatus capability information indicating whether or not it is possible to aggregate the resources of the cells in the FDD band and the TDD band, and may transmit this transfer terminal apparatus capability information instead of either terminal apparatus capability information (or either combination of these pieces of terminal apparatus capability information).

Moreover, the embodiments described above are only simple examples, and can be realized using various modification examples and substituent examples. For example, an uplink transmission scheme is also able to be applied to a communication system in compliance with either a frequency division duplex (FDD) scheme or a time division duplex (TDD) scheme. Furthermore, because the name of each parameter or each event that is described according to the embodiments is given for convenience of description, even if the name that is applied in practice and the name according to the embodiments of the present invention are different from each other, this does not exert any influence on the gist of the invention claimed, in the embodiments of the present invention.

Furthermore, the term "connection" that is used in each embodiment is not limited only to the configuration in which a certain device or apparatus and another certain device or apparatus are connected directly to each other using a physical circuit, and includes the meaning of a configuration in which a connection is made logically or of a configuration in which a wireless connection is made using a wireless technology.

Furthermore, the terminal apparatuses 1 are not limited to portable or movable mobile station apparatus, and include a stationary-type electronic apparatus that is installed indoors or outdoors and a non-movable-type electronic apparatus, for example, an AV apparatus, a kitchen apparatus, a cleaning or washing machine, an air conditioner, office equipment, a vending machine, other household apparatuses or measurement apparatuses, a vehicle-mounted apparatus, and a wearable device, a health care device, or the like that can be worn on a human body, which is equipped with a communication function. Furthermore, the terminal apparatus 1 is used not only for human-to-human or human-to-machine communication, but also for machine-to-machine communication (machine type communication or machine type communication) or device-to-device communication (D2D).

The terminal apparatus 1 is also referred to as a user terminal, a mobile station apparatus, a communication terminal, a mobile device, a terminal, user equipment (UE), and a mobile station (MS). The base station apparatus 2 is also referred to as a wireless base station apparatus, a base station, a wireless base station, a stationary station, a Node B (NB), an evolved Node B (eNB), a base transceiver station (BTS), and a base station (BS).

Moreover, the base station apparatus 2 is referred to as an NB in UMTS that is stipulated by 3GPP, and is referred to as an eNB in EUTRA and Advanced EUTRA. Moreover, the terminal apparatus 1 is referred to as UE in UMTS, EUTRA, and Advanced EUTRA that stipulated by 3GPP.

Furthermore, for convenience of description, a method or means for realizing each of functions of the units of the terminal apparatus 1 and the base station apparatus 2 or some of the functions, or a specific combination of algorithm steps is described, but can be directly embodied by a hardware item, a software module that is implemented by a processor, or a combination of these.

If these are embodied in hardware, in addition to the constituent units in block diagrams, which are described, the terminal apparatus 1 and the base station apparatus 2 each are constituted from a power supply device or a battery that supplies power to the terminal apparatus 1 or the base station apparatus 2, a display device such as a liquid crystal device, a display drive device, a memory, an input and output interface, input and output terminals, a speaker, and other peripheral devices.

If these are embodied in software, their functionality can be recorded, as one or more commands or codes, on a computer-readable medium, or can be distributed. The computer-readable media include both communication media that include a medium which serves to carry a computer program from a place to another and computer recording media.

Then, one or more commands or codes may be recorded on the computer-readable recording medium and a computer system may be caused to read the one or more commands or codes recorded on the recording medium for execution. Thus, control of the terminal apparatus 1 or the base station apparatus 2 may be performed. Moreover, the "computer system" here is defined as including an OS and hardware components such as a peripheral device.

The operations according to each of the embodiments of the present invention, which are described, may be realized as a program. A program running on the terminal apparatus 1 and the base station apparatus 2 according to each of the embodiments of the present invention is a program (a program for causing the computer to operate) that controls a CPU and the like in such a manner as to realize the functions according to each of the embodiments of the present invention, which are described above. Then, pieces of information that are handled in the device and the apparatus are temporarily stored in a RAM while being processed. Thereafter, the pieces of information are stored in various ROMs or HDDs, and if need arises, is read by the CPU to be modified or written.

Furthermore, in some cases, the functions according to the embodiments described above are realized by executing the program, and in addition, the functions according to each of the embodiments of the present invention are realized by performing processing in conjunction with an operating system or other application programs, based on an instruction from the program.

Furthermore, the expression "computer-readable recording medium" is used to include a portable medium, such as a semiconductor medium (for example, a RAM, a nonvolatile memory card, or the like), an optical storage medium (for example, a DVD, an MO, an MD, a CD, a BD, or the like), or a magnetic recording medium (for example, a magnetic tape, a flexible disk, or the like), or to include a storage device, such as a disk unit that is built into the computer system. Moreover, the expression "computer-readable recording medium" is defined as including whatever dynamically retains the program for a short period of time, such as a communication line that is used when transmitting the program over a network such as the Internet or over a communication circuit such as a telephone circuit and is defined as including whatever retains the program for a given period of time, such as a volatile memory within the computer system, which functions as a server or a client in the case of retaining the program dynamically.

Furthermore, the program described above may be one for realizing some of the functions described above and additionally may be one that can realize the functions described above in combination with a program that is already recorded on the computer system.

Furthermore, each functional block or features of the terminal apparatus 1 and the base station apparatus 2 according to each of the embodiments, which are described above, can be built into or implemented by a general-purpose processor or a digital signal processor (DSP), which is designed in such a manner as to perform the functions described in the present specification, an application-specific integrated circuit (ASIC), any general-purpose integrated circuit (IC), a field programmable gate-array signal (FPGA), a programmable logic device, a discrete gate, a transistor logic, a discrete hardware component, or combinations of these.

The general-purpose processor may be a microprocessor. Instead, the processor may be a processor in the related art, a controller, a microcontroller, or a state machine. The general-purpose processor or each circuit described above may be constituted from digital circuits, and may be constituted from analog circuits.

Furthermore, the processor may be built as a combination of computing devices. For example, a DSP and a microprocessor, multiple microprocessors; or one or more microprocessor that are connected to a DSP core may be combined, or other combinations may be possible in this manner.

The embodiments of the invention are described in detail above based on the specific examples, but it is apparent that the nature of each of the embodiments of the present invention and a scope of claims are not limited to the specific examples. A change in design and the like that fall within the scope that does not depart from the gist of the invention are also included. That is, the description in the present specification serves the purpose of the disclosure in a descriptive manner, and thus, no limitation is imposed on each of the embodiments of the present invention.

Furthermore, various modifications are possible within the scope of the present invention defined by claims, and embodiments that are made by suitably combining technical means disclosed according to each of the different embodiments are also included in the technical scope of the present invention. Furthermore, a configuration in which a constituent element that achieves the same effect is substituted for the one that is described according to each of the embodiments described above is also included in the technical scope of the present invention.

INDUSTRIAL APPLICABILITY

The present invention can be applied to a mobile phone, a personal computer, a tablet-type computer, and the like.

REFERENCE SIGNS LIST

1 TERMINAL APPARATUS
2, 2-1, 2-2 BASE STATION APPARATUS
101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
211 NETWORK SIGNAL TRANSMISSION AND RECEPTION UNIT
R01, R02 RECEIVE ANTENNA UNIT
T01, T02 TRANSMIT ANTENNA UNIT

The invention claimed is:

1. A terminal apparatus using a plurality of cell groups, the terminal apparatus comprising:
control circuitry configured to generate a capability message of the terminal apparatus, the capability message comprising capability information which comprises first information and second information,
the first information indicating whether or not to support data transfer using a plurality of cell groups, and
the second information indicating whether or not to support bearer split transmission; and
transmission circuitry configured to transmit, to a base station apparatus, the capability message of the terminal apparatus, wherein
the data transfer for each of the plurality of cell groups is performed by one of a plurality of Medium Access Control (MAC) functions, each of the plurality of MAC functions corresponding to one of the plurality of cell groups, and
a physical uplink control channel (PUCCH) is transmitted for each of the plurality of cell groups corresponding to each of the plurality of MAC functions.

2. The terminal apparatus according to claim 1, wherein the first information is respectively configured for each of a plurality of combinations of frequency bands supported by the terminal apparatus.

3. A communication method of a terminal apparatus using a plurality of cell groups, the communication method comprising:
generating a capability message of the terminal apparatus, the capability message comprising capability information which comprises first information and second information,
the first information indicating whether or not to support data transfer using a plurality of cell groups, and
the second information indicating whether or not to support bearer split transmission; and
transmitting, to a base station apparatus, the capability message of the terminal apparatus, wherein
the data transfer for each of the plurality of cell groups is performed by one of a plurality of Medium Access Control (MAC) functions, each of the plurality of MAC functions corresponding to one of the plurality of cell groups, and
a physical uplink control channel (PUCCH) is transmitted for each of the plurality of cell groups corresponding to each of the plurality of MAC functions.

4. The communication method according to claim 3, wherein
the first information is respectively configured for each of a plurality of combinations of frequency bands supported by the terminal apparatus.

5. A base station apparatus using a plurality of cell groups, the base station apparatus comprising:
reception circuitry configured to receive, from a terminal apparatus, a capability message of a terminal apparatus, the capability message comprising capability information which comprises at least first information and second information,
the first information indicating whether or not to support, data transfer using a plurality of cell groups, and
the second information indicating whether or not to support bearer split transmission; and
transmission circuitry configured to perform, by one of a plurality of Medium Access Control (MAC) functions, the data transfer for each of the plurality of cell groups, each of the plurality of MAC functions corresponding to one of the plurality of cell groups,
a physical uplink control channel (PUCCH) being received for each of the plurality of cell groups corresponding to each of the plurality of MAC functions.

6. The base station apparatus according to claim 5, wherein
the first information is respectively configured for each of a plurality of combinations of frequency bands supported by the terminal apparatus.

7. A communication method of a base station apparatus using a plurality of cell groups, the base station apparatus comprising:
receiving, from a terminal apparatus, a capability message of a terminal apparatus, the capability message comprising capability information which comprises at least first information and second information,
the first information indicating whether or not to support, data transfer using a plurality of cell groups, and
the second information indicating whether or not to support bearer split transmission; and
performing, by one of a plurality of Medium Access Control (MAC) functions, the data transfer for each of the plurality of cell groups, each of the plurality of MAC functions corresponding to one of the plurality of cell groups,
a physical uplink control channel (PUCCH) being received for each of the plurality of cell groups corresponding to each of the plurality of MAC functions.

8. The communication method according to claim 7, wherein
the first information is respectively configured for each of a plurality of combinations of frequency bands supported by the terminal apparatus.

* * * * *